(12) United States Patent
Nelson et al.

(10) Patent No.: US 11,456,917 B2
(45) Date of Patent: Sep. 27, 2022

(54) ANALYZING DEPLOYED NETWORKS WITH RESPECT TO NETWORK SOLUTIONS

(71) Applicant: Cisco Technology, Inc., San Jose, CA (US)

(72) Inventors: Howard Steven Nelson, Apex, NC (US); Derek William Engi, Raleigh, NC (US); Gonzalo Salgueiro, Raleigh, NC (US); Vijay Pillai, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/889,306

(22) Filed: Jun. 1, 2020

(65) Prior Publication Data
US 2021/0377114 A1 Dec. 2, 2021

(51) Int. Cl.
| H04L 41/0893 | (2022.01) |
| G06N 20/00 | (2019.01) |
| H04L 41/16 | (2022.01) |
| H04L 41/0813 | (2022.01) |
| G06K 9/62 | (2022.01) |

(52) U.S. Cl.
CPC ........ H04L 41/0813 (2013.01); G06K 9/6256 (2013.01); G06K 9/6282 (2013.01); G06N 20/00 (2019.01); H04L 41/0893 (2013.01); H04L 41/16 (2013.01)

(58) Field of Classification Search
CPC ........... H04L 41/08–0893; H04L 41/16; H04L 41/20; H04L 41/28; G06K 9/6267–6287; G06N 20/00–20
See application file for complete search history.

(56) References Cited

U.S. PATENT DOCUMENTS

| 6,502,131 B1 * | 12/2002 | Vaid | H04L 1/1854 709/224 |
| 6,816,903 B1 * | 11/2004 | Rakoshitz | H04L 41/5003 370/230 |

(Continued)

OTHER PUBLICATIONS

M. Barrère, R. Badonnel and O. Festor, "Collaborative remediation of configuration vulnerabilities in autonomic networks and systems," 2012 8th international conference on network and service management (cnsm) and 2012 workshop on systems virtualiztion management (svm), Las Vegas, NV, USA, pp. 357-363 (Year: 2012).*

*Primary Examiner* — Glenton B Burgess
*Assistant Examiner* — Julian Chang
(74) *Attorney, Agent, or Firm* — Lee & Hayes, P.C.

(57) ABSTRACT

Techniques and architecture for determining compliance of a network with respect to a network design solution. The techniques may include determining a role for each network device of a network that comprises multiple network devices and determining one or more policies related to each network device with respect to other network devices of the network. The techniques may further include based at least in part on the roles for each network device and the one or more policies, determining a level of compliance of a configuration of the network with respect to a network design solution. Based at least in part on the level of compliance, a remedial action may be performed. In configurations, a machine learning model may be used.

20 Claims, 28 Drawing Sheets

(56) References Cited

U.S. PATENT DOCUMENTS

| | | | | |
|---|---|---|---|---|
| 7,411,915 B1* | 8/2008 | Spain | H04L 41/0806 | 370/250 |
| 8,874,705 B1* | 10/2014 | Satish | G06F 11/008 | 709/221 |
| 9,137,110 B1* | 9/2015 | Adogla | H04L 41/145 | |
| 9,319,343 B2* | 4/2016 | Khandelwal | H04L 41/0896 | |
| 10,419,282 B1* | 9/2019 | Cosgrove | H04L 41/0886 | |
| 10,558,542 B1* | 2/2020 | A | G06F 11/3051 | |
| 10,587,457 B1* | 3/2020 | Helbing | H04L 41/0672 | |
| 10,666,746 B1* | 5/2020 | Patanella | G06F 16/9024 | |
| RE48,073 E* | 6/2020 | Macauley | H04L 41/12 | |
| 10,742,501 B1* | 8/2020 | Pianigiani | H04L 41/082 | |
| 10,756,990 B1* | 8/2020 | Chakkassery Vidyadharan | G06N 20/00 | |
| 10,797,987 B1* | 10/2020 | Beacham | H04L 49/25 | |
| 10,810,093 B1* | 10/2020 | Tucek | H04L 41/0806 | |
| 10,862,749 B1* | 12/2020 | Kiyak | H04L 41/147 | |
| 10,873,604 B1* | 12/2020 | Aloisio | H04L 63/1441 | |
| 10,938,660 B1* | 3/2021 | Kapur | H04L 45/64 | |
| 2002/0052941 A1* | 5/2002 | Patterson | H04L 67/34 | 709/223 |
| 2003/0023711 A1* | 1/2003 | Parmar | H04L 41/0893 | 709/223 |
| 2004/0006618 A1* | 1/2004 | Kasai | H04L 12/4641 | 709/223 |
| 2004/0249916 A1* | 12/2004 | Graves | H04L 12/4675 | 709/223 |
| 2005/0138164 A1* | 6/2005 | Burton | H04L 41/0806 | 709/224 |
| 2005/0204027 A1* | 9/2005 | Claseman | H04L 41/26 | 709/223 |
| 2006/0190775 A1* | 8/2006 | Aggarwal | H04L 41/0816 | 714/100 |
| 2006/0200856 A1* | 9/2006 | Salowey | H04L 9/32 | 726/5 |
| 2008/0005161 A1* | 1/2008 | Grealish | H04L 41/22 | |
| 2008/0049779 A1* | 2/2008 | Hopmann | H04L 12/2807 | 370/431 |
| 2008/0052384 A1* | 2/2008 | Marl | H04L 41/0273 | 709/223 |
| 2008/0168532 A1* | 7/2008 | Carter | G06Q 10/06 | 726/1 |
| 2008/0225754 A1* | 9/2008 | Jiang | H04L 41/12 | 370/255 |
| 2008/0232379 A1* | 9/2008 | Mohamed | H04L 45/42 | 370/395.53 |
| 2009/0100158 A1* | 4/2009 | Sonkin | H04L 41/0856 | 709/221 |
| 2010/0005505 A1* | 1/2010 | Gottimukkala | H04L 41/082 | 726/1 |
| 2010/0214940 A1* | 8/2010 | Macauley | H04L 41/0806 | 370/252 |
| 2012/0218917 A1* | 8/2012 | Komarevtsen | H04L 41/0843 | 370/254 |
| 2013/0041995 A1* | 2/2013 | Yao | H04L 41/50 | 709/223 |
| 2014/0164607 A1* | 6/2014 | Bai | H04L 41/14 | 709/224 |
| 2014/0310401 A1* | 10/2014 | Thomas | H04L 41/5003 | 709/224 |
| 2015/0082432 A1* | 3/2015 | Eaton | G06F 9/5072 | 726/23 |
| 2015/0188763 A1* | 7/2015 | Cox | H04L 41/0806 | 709/220 |
| 2015/0188989 A1* | 7/2015 | Chaliparambil | H04L 67/10 | 709/204 |
| 2015/0271014 A1* | 9/2015 | Madama | H04L 41/0893 | 709/222 |
| 2015/0280993 A1* | 10/2015 | Gourlay | H04L 41/0893 | 370/254 |
| 2015/0281287 A1* | 10/2015 | Gill | H04L 63/20 | 726/1 |
| 2015/0281398 A1* | 10/2015 | Walls | H04L 41/0876 | 709/226 |
| 2015/0312099 A1* | 10/2015 | Stalzer | H04L 41/0893 | 709/221 |
| 2015/0379429 A1* | 12/2015 | Lee | G06N 20/00 | 706/11 |
| 2015/0379430 A1* | 12/2015 | Dirac | G06N 20/00 | 706/12 |
| 2016/0072676 A1* | 3/2016 | Gomadam | H04L 41/0843 | 709/221 |
| 2016/0087956 A1* | 3/2016 | Maheshwari | H04L 63/20 | 726/6 |
| 2016/0127173 A1* | 5/2016 | Gagnon | H04L 12/40019 | 709/211 |
| 2016/0134463 A1* | 5/2016 | Bellizia | H04L 41/0893 | 709/223 |
| 2016/0195864 A1* | 7/2016 | Kim | G05B 15/02 | 709/221 |
| 2016/0219117 A1* | 7/2016 | Marlatt | H04L 67/322 | |
| 2016/0255095 A1* | 9/2016 | Maes | H04L 41/12 | 726/1 |
| 2016/0277235 A1* | 9/2016 | Bhesania | H04W 84/20 | |
| 2016/0285966 A1* | 9/2016 | Brech | G06F 3/126 | |
| 2016/0309001 A1* | 10/2016 | Ramachandran | H04L 63/102 | |
| 2016/0352640 A1* | 12/2016 | Kompella | H04L 41/0866 | |
| 2017/0075919 A1* | 3/2017 | Bose | G06F 21/6245 | |
| 2017/0093632 A1* | 3/2017 | Kalyana | H04L 41/0886 | |
| 2017/0171021 A1* | 6/2017 | Angaluri | G06F 8/63 | |
| 2017/0195187 A1* | 7/2017 | Bennett | H04L 41/0866 | |
| 2017/0207972 A1* | 7/2017 | Lehman | H04L 41/082 | |
| 2017/0255530 A1* | 9/2017 | Barzik | G06F 3/0631 | |
| 2017/0318479 A1* | 11/2017 | Cotanis | H04L 43/16 | |
| 2017/0346684 A1* | 11/2017 | Ratkovic | H04L 67/16 | |
| 2017/0374061 A1* | 12/2017 | Jayanti Venkata | H04L 63/08 | |
| 2018/0139241 A1* | 5/2018 | Jacobsen | H04L 63/20 | |
| 2018/0211037 A1* | 7/2018 | Boutnaru | G06F 11/323 | |
| 2018/0241846 A1* | 8/2018 | Narayanan | H04L 41/0889 | |
| 2018/0270110 A1* | 9/2018 | Chugtu | H04L 67/34 | |
| 2018/0270114 A1* | 9/2018 | Indiresan | H04L 41/0869 | |
| 2018/0278477 A1* | 9/2018 | Auvenshine | H04L 41/12 | |
| 2018/0302273 A1* | 10/2018 | Dome | H04L 41/0896 | |
| 2018/0314971 A1* | 11/2018 | Chen | H04L 67/1065 | |
| 2018/0367412 A1* | 12/2018 | Sethi | H04L 41/0853 | |
| 2019/0007463 A1* | 1/2019 | Pelton | H04L 65/4046 | |
| 2019/0017982 A1* | 1/2019 | Lamberti | G01N 21/359 | |
| 2019/0089742 A1* | 3/2019 | Hill | H04L 41/22 | |
| 2019/0104156 A1* | 4/2019 | Barkovic | G06F 11/3452 | |
| 2019/0129705 A1* | 5/2019 | Bulut | G06F 21/50 | |
| 2019/0129823 A1* | 5/2019 | Pell | G06F 11/079 | |
| 2019/0149416 A1* | 5/2019 | Grevers, Jr. | H04L 41/12 | 370/254 |
| 2019/0149567 A1* | 5/2019 | Bailey | H04L 41/20 | 726/23 |
| 2019/0171967 A1* | 6/2019 | Friesen | G06N 20/00 | |
| 2019/0261203 A1* | 8/2019 | Raleigh | H04L 47/14 | |
| 2019/0289038 A1* | 9/2019 | Li | H04L 63/0227 | |
| 2019/0319855 A1* | 10/2019 | Barton | G06F 8/60 | |
| 2019/0332282 A1* | 10/2019 | Urakami | G06F 3/0605 | |
| 2019/0334765 A1* | 10/2019 | Jain | H04L 41/0873 | |
| 2019/0379723 A1* | 12/2019 | Demasi | H04L 67/06 | |
| 2020/0007407 A1* | 1/2020 | Ito | H04L 41/085 | |
| 2020/0007411 A1* | 1/2020 | Arar | H04W 4/50 | |
| 2020/0007468 A1* | 1/2020 | Johnsen | H04L 41/0803 | |
| 2020/0021620 A1* | 1/2020 | Puratheparambil | H04L 63/145 | |
| 2020/0044927 A1* | 2/2020 | Apostolopoulos | H04L 43/04 | |
| 2020/0044934 A1* | 2/2020 | Collison | H04L 41/084 | |
| 2020/0067879 A1* | 2/2020 | Lemay | H04L 41/0853 | |
| 2020/0082004 A1* | 3/2020 | Dubost | G06F 16/219 | |
| 2020/0092171 A1* | 3/2020 | Ramakrishnan | H04L 41/12 | |
| 2020/0099583 A1* | 3/2020 | Arko | H04L 41/22 | |
| 2020/0106675 A1* | 4/2020 | Sirton | H04L 41/22 | |
| 2020/0136957 A1* | 4/2020 | Sanchez Charles | H04L 45/08 | |
| 2020/0151622 A1* | 5/2020 | Mermoud | G06N 7/005 | |
| 2020/0177466 A1* | 6/2020 | Rossi | G06N 20/00 | |
| 2020/0193316 A1* | 6/2020 | Chaturvedi | G06N 20/00 | |
| 2020/0201983 A1* | 6/2020 | Shantharam | G06F 8/65 | |
| 2020/0244526 A1* | 7/2020 | Chaganti | G06F 9/5072 | |

(56) References Cited

U.S. PATENT DOCUMENTS

| | | | |
|---|---|---|---|
| 2020/0244540 A1* | 7/2020 | Yamashita | H04W 40/24 |
| 2020/0272915 A1* | 8/2020 | Tata | G06N 5/003 |
| 2020/0274895 A1* | 8/2020 | Kulaga | G06F 16/285 |
| 2020/0296112 A1* | 9/2020 | Namboodiri | G06F 21/44 |
| 2020/0366563 A1* | 11/2020 | Patil | H04L 41/0806 |
| 2020/0380420 A1* | 12/2020 | Sbandi | G06N 20/10 |
| 2020/0382527 A1* | 12/2020 | Mitelman | G06F 16/9038 |
| 2020/0389477 A1* | 12/2020 | Ambrosi | H04L 41/142 |
| 2020/0401849 A1* | 12/2020 | Kansal | G06N 5/003 |
| 2021/0006470 A1* | 1/2021 | Hotta | H04L 45/02 |
| 2021/0014124 A1* | 1/2021 | Rossi | H04L 43/045 |
| 2021/0019761 A1* | 1/2021 | Dhekane | G06Q 30/012 |
| 2021/0021636 A1* | 1/2021 | Sbandi | H04L 63/1433 |
| 2021/0099489 A1* | 4/2021 | Ivanov | H04L 63/1441 |
| 2021/0152490 A1* | 5/2021 | Rampley | H04L 41/5019 |
| 2021/0194924 A1* | 6/2021 | Heinemeyer | G06F 21/577 |
| 2021/0243078 A1* | 8/2021 | Sethuramalingam | H04L 41/0843 |

* cited by examiner

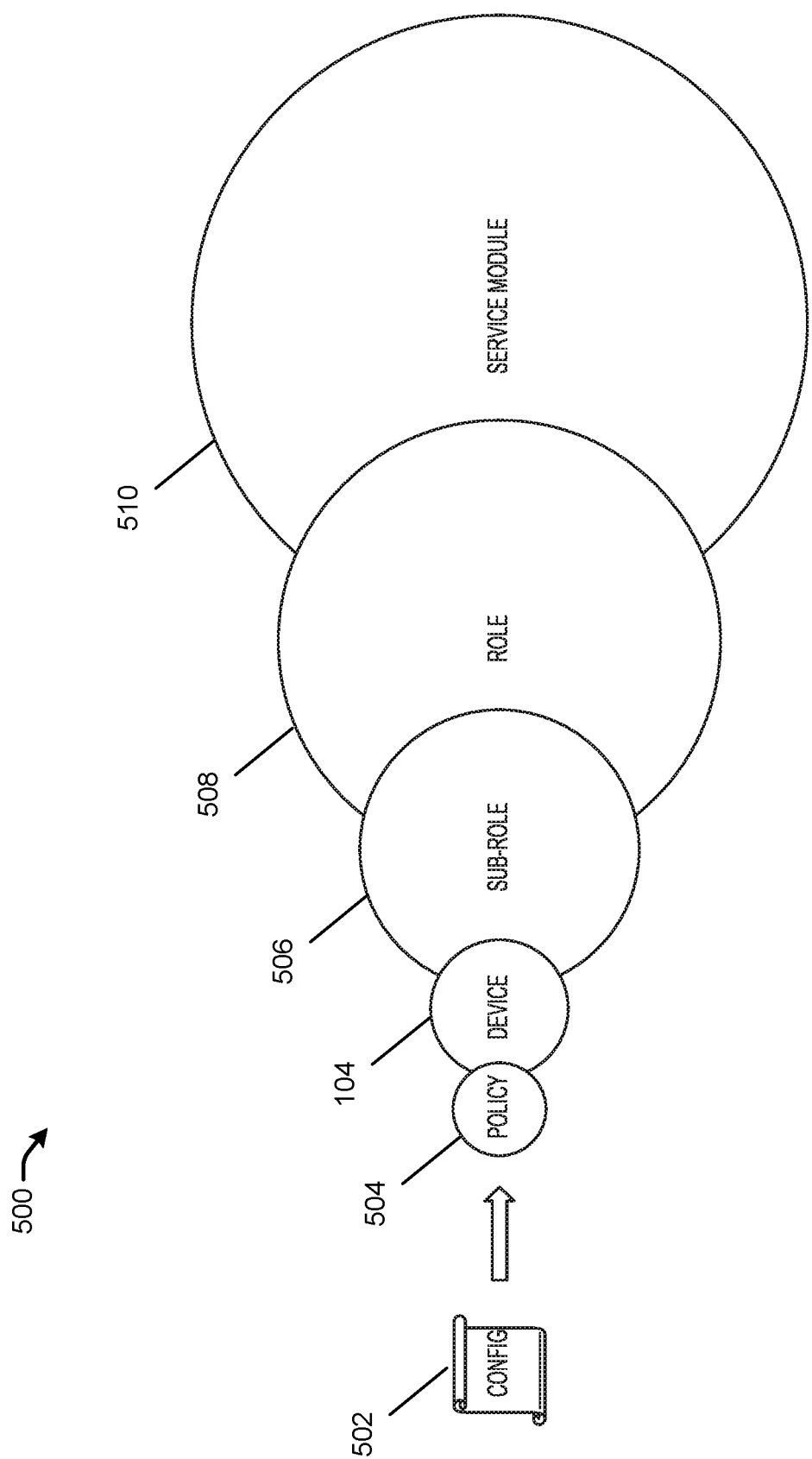

1800 ⟶

```
┌─────────────────────────────────────────────────────────────────────────────┐
│ DETERMINE A ROLE FOR EACH NETWORK DEVICE OF A NETWORK THAT COMPRISES MULTIPLE│
│                              NETWORK DEVICES                                 │
│                                    1802                                      │
└─────────────────────────────────────────────────────────────────────────────┘
                                     │
                                     ▼
┌─────────────────────────────────────────────────────────────────────────────┐
│ DETERMINE ONE OR MORE POLICIES RELATED TO EACH NETWORK DEVICE WITH RESPECT TO│
│                    OTHER NETWORK DEVICES OF THE NETWORK                      │
│                                    1804                                      │
└─────────────────────────────────────────────────────────────────────────────┘
                                     │
                                     ▼
┌─────────────────────────────────────────────────────────────────────────────┐
│ BASED AT LEAST IN PART ON THE ROLES FOR EACH NETWORK DEVICE AND THE ONE OR   │
│   MORE POLICIES, DETERMINE A LEVEL OF COMPLIANCE OF A CONFIGURATION OF THE   │
│           NETWORK WITH RESPECT TO A NETWORK DESIGN SOLUTION                  │
│                                    1806                                      │
└─────────────────────────────────────────────────────────────────────────────┘
                                     │
                                     ▼
┌─────────────────────────────────────────────────────────────────────────────┐
│    BASED AT LEAST IN PART ON THE LEVEL OF COMPLIANCE, PERFORM A REMEDIAL ACTION│
│                                    1808                                      │
└─────────────────────────────────────────────────────────────────────────────┘
```

FIG. 18

ANALYZING DEPLOYED NETWORKS WITH RESPECT TO NETWORK SOLUTIONS

TECHNICAL FIELD

The present disclosure relates generally to analyzing deployed network devices to validate networks wide design implementations.

BACKGROUND

In computer network deployments, network operators of large networking infrastructures leverage a host of technologies and solutions to solve the business challenges that they face. Complex large-scale network environments may employ twenty to thirty "technology solutions," all either interlinked or overlaid into a patchwork of network solutions. Traditionally, such a patchwork has been near impossible to forensically disentangle, extricate, and/or isolate with respect individual technology solutions. In addition, machine consumption and automated analysis of network designs has to this point been unattainable due to the lack of a consistent design framework. With network elements from multiple vendors and/or industry design standards (e.g., design templates, configuration guides, white papers, vendor validated architectures) in such network deployments, it can be challenging to determine exactly what solutions or rather, combinations of solutions, a network operator has enabled in their network environment.

Part of the determination with respect to solution deployment within networks includes the fact that designs and solutions are based on the interaction of multiple network devices, each performing numerous complimentary tasks that coalesce to achieve business goals. With near endless variation in network device configuration possibilities, it is necessary to either rely on manual categorization or broad feature usage to dictate what particular function a network device serves within a network. Thus, engineers investigating networks generally rely on a "stare and compare" manual process or "tribal knowledge" when determining what role a network device is performing and how important the network device is to the business solution the network enables. Without such a role of the network device and an importance of the network device, design context may be lost and the ability to automate architectural analysis may be severely limited.

Additionally, best practices for network design dictate that repeatable and consistent service modules should be defined to ease deployment, reduce complexity, and establish a functional hierarchy within a network environment. Despite the benefits of such a modular design philosophy, optimization and large-scale solution validations are often have no way to infer modularity from data collected from individual devices. This leads to a slow and labor-intensive manual processes, one which finds investigating engineers pouring over line-by-line configurations across thousands of individual network devices.

An additional challenge includes the lack of a consistent design analysis framework, which limits design analysis output reuse across networks since the results are not directly comparable. For example, network operators aggregate network devices into service modules, e.g., consistent policy boundaries where network devices are configured a particular way to solve a business challenge. Thus, investigating engineers are generally bounded by the quality and completeness of design documentation provided by network operators. This makes identifying the association of network designs to business outcomes difficult and requires a labor-intensive reverse engineering solution deployment components into the business logic that justifies their use. Numerous design implementation and configuration configurations add complexity with the interpretation of the business challenges network operators are trying to solve. A service boundary and design module framework is needed to systematically evaluate complex relational policies deployed in networks against vendor validated designs and provide holistic design insights.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 schematically illustrates an example of design objects that are derived from the configuration of network devices.

FIG. 18 illustrates a flow diagram of an example method for determining compliance of a network with respect to a network design solution as described herein with respect to FIGS. 1-17.

DESCRIPTION OF EXAMPLE EMBODIMENTS

Overview

Figure 1:
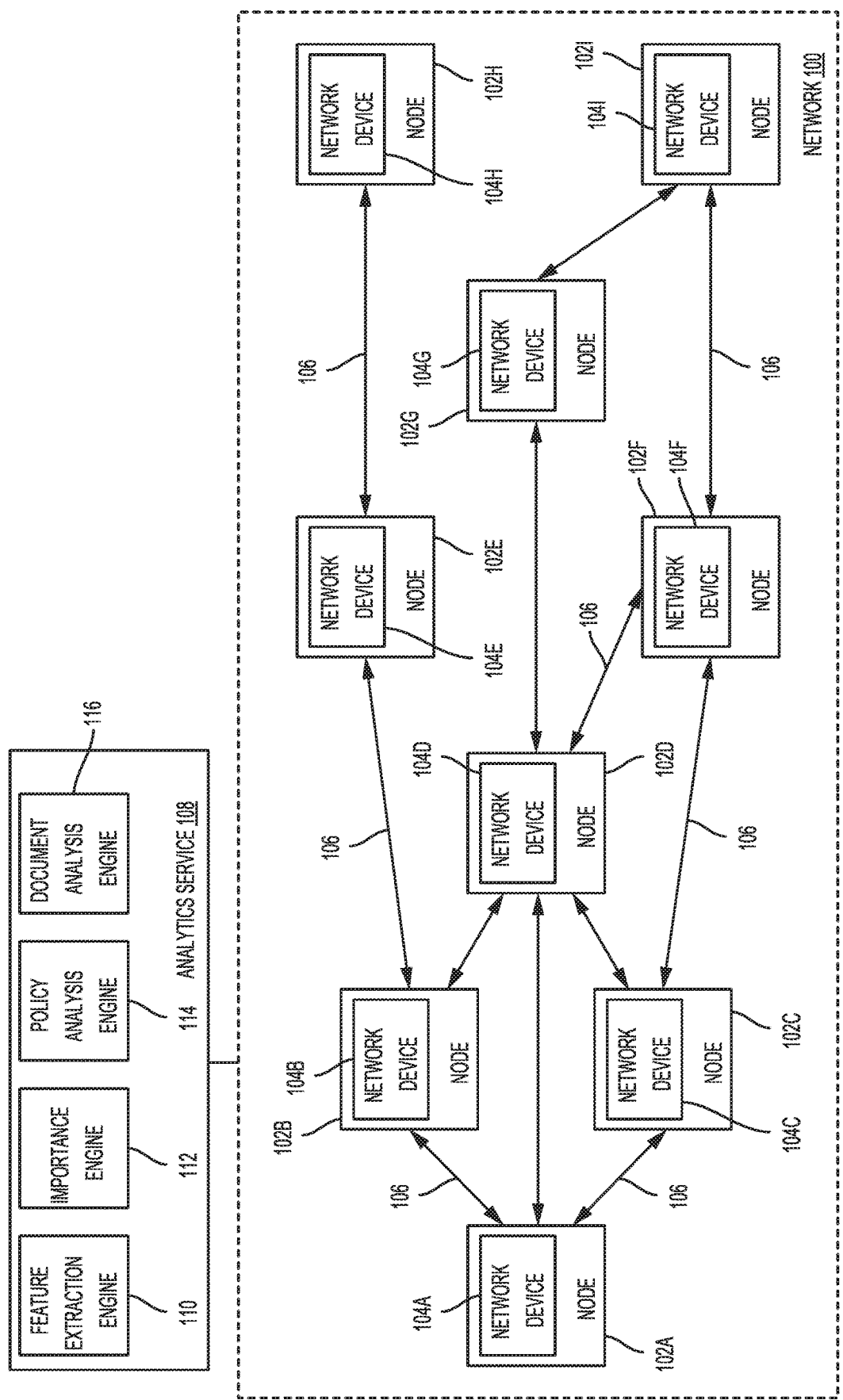
FIG. 1 schematically illustrates an example arrangement of a network and an analytics service.

This disclosure describes a method for determining compliance of a network with respect to a network design solution. The method may include determining a role for each device taking part in a large-scale network deployment. The method may also include determining one or more policies related to each network device with respect to neighboring devices in the network topology. The method may further include based at least in part on the roles for each network device and the one or more policies, determining a level of compliance of a configuration of the network with respect to a network design solution. Also, the method may include based at least in part on the level of compliance, performing a remedial action.

Additionally, the method may include determining an importance of each device, wherein determining a level of compliance of the configuration of the network with respect to the network design solution is further based at least in part on the importance of device, the association of role and the relationships between devices. The method may also include determining that a first service module comprising a first set of network devices is configured differently than a second service module comprising a second set of network devices. Furthermore, in configurations, one or more machine learning models may be used in performing at least some parts of the method. In configurations, a Random Forest model may be used.

Additionally, the techniques described herein may be performed by a system and/or device having non-transitory computer-readable media storing computer-executable instructions that, when executed by one or more processors, performs the method described above.

Example Embodiments

Enterprises and other organizations may deploy networks comprising hundreds, even thousands or more, of network devices. In order to achieve business goals for such deployed networks, network design solutions are utilized to configure and implement the networks.

In order to analyze and/or validate implemented network design solutions, roles for the various network devices may be discovered, e.g., determined, for a network. In configurations, a machine learning (ML) model may be used to analyze and discover the roles of the various network devices in the network. For example, a "place in network" (PIN) may comprise a ML capability that classifies the functional role and importance of a networking device modeled after the inferred thought process of a network operator's configuration decisions. Thus, the configuration of a network device may be dynamically parsed into hundreds of thousands of individual components that are then compared against known network devices serving particular roles in various computing environments. In configurations, a Random Forest ML model may be used to predict the role classifier through a training set mined from historical network configurations.

In configurations, once the roles of the various network devices in the network have been determined, then policies with respect to the network devices may be analyzed. A policy may be a definition of a relationship between network devices. For example, how do the network devices communicate with one another, e.g., via communication conduits? In configurations, models may be developed where the models depict relational activity based on network deployment data. As the manners in which network devices interact with each other are determined, predictions may be made as to how service modules should be structured. Such data includes policies, e.g., network operator created segments of metadata, that define the operating functionality of network nodes and the relationships between network nodes. Each network node may comprise one or more network devices.

The end-to-end chaining of policies and relationships establish how network operators implement solutions to meet requirements that solve a business problem. By providing a framework that breaks up a network into the building blocks of design objects, various levels of macro and micro audits across complex networks may be performed. Thus, insight may be provided as to whether "a first data center is configured the same as a second data center," or "all remote office networks are in compliance with an intended design." Such are typical questions that may require deep analysis of network and/or network device configuration and context. In configurations, RSPA may be stored as elements in a graph database. The graphs preserve intra-device RSPA and become a mechanism to establish inter-device RSPA. In configurations, the RSPA may be captured within categorical containers created using data science and machine learning techniques.

Once the roles have been discovered and the policy/communication flows, e.g., RSPA, among the network devices have been determined, the roles and RSPA may be used as building blocks of a framework that analyzes and/or validates network design solutions.

Thus, a network solution may be provided to an operator of a network for implementing or deploying within a production network. Generally, such a design defines a solution for a network that achieves a desired business goal or goals for the operator of the network. In order to analyze and evaluate the implementation of the network solution in deploying the network, the role, relationship and policy flow in the computer network may be analyzed to determine the roles of the network devices, the flows between the network devices and the relationships between the network devices. Such an overall analysis may provide the network operator with a degree of certainty as to how well a proposed solution has been implemented. Thus, in configurations, audits may be periodically performed to monitor implemented network solutions. The audits may also provide an opportunity to modify or alter proposed network solutions. For example, it may be determined that network operators are only achieving an 85-90 percent implementation of the network solutions. This may indicate that 10-15 percent of the network solution is consistently ignored by network operators and thus, not a desirable part of the network solution. Thus, the network solution may be adapted or altered accordingly by the solution developer. Additionally, results of analysis with respect to the computer network may provide indications for changes to be made to the network or networks and/or for the orchestration or implementation of future networks.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates a portion of a network 100 that includes multiple nodes 102a-102i, which may be referred to singularly or collectively as nodes 102. Each of the nodes 102 may comprise one or more network devices 104. The nodes 102 communicate with one another via communication conduits 106. An analytics service 108 may be provided to gather data and/or metadata relating to the operation and configuration of the network 100, including the network devices 104 and/or the various nodes 102. In some configurations, the analytics service 108 may be part of the network 100. The gathered data and/or metadata may be used to determine a degree of success with respect to implementation of a network solution to achieve one or more business goals of an operator of the network 100. The network 100 includes many more network nodes 102 and network devices 104, e.g., hundreds, thousands, or even more.

As previously noted, in configurations, in order to analyze and/or validate an implemented network design solution for the network 100, roles for the various network devices 104 may be discovered, e.g., determined, for the network 100. In configurations, a machine learning (ML) model may be used to analyze and discover the roles of the various network devices 104 in the network 100. For example, a "Place in Network" (PIN) may comprise a machine learning capability that classifies the functional role and importance of a networking device 104 modeled after the inferred thought process of a network operator's configuration decisions. Thus, the configuration of a network device 104 may be dynamically parsed into hundreds of thousands of individual components that are then compared against known network devices serving particular roles in various computing environments.

In configurations, the machine learning model may be used to predict the role classification through a training set of data mined from historical network configurations including data from the network 100 as well as other networks and/or network devices external to the network 100. In configurations, the machine learning model, also known as a deep learning model, may comprise a Random Forest machine learning model, which is a supervised algorithm. In other configurations, the machine learning model may comprise an architecture related to a recurrent neural network, for example, a long short-term memory (LSTM) neural network. LSTM is an artificial recurrent neural network (RNN) architecture used in the field of deep learning. Unlike standard feedforward neural networks, LSTM has feedback connections. It can not only process single data points (such as images), but also entire sequences of data. Other architectures and algorithms may be used for the deep learning model if desired.

In configurations, the training data for the machine learning model may be developed to categorize the application of network device 104 usage to perform certain functions, and to develop the machine learning model that is established to make predictions of functional role based on these learned behaviors. The machine learning model establishes a modeled pattern behind the thought process an engineer uses when solving a problem, rather than relying on the static rules of feature and hardware dictating the role of a device.

Figure 2:
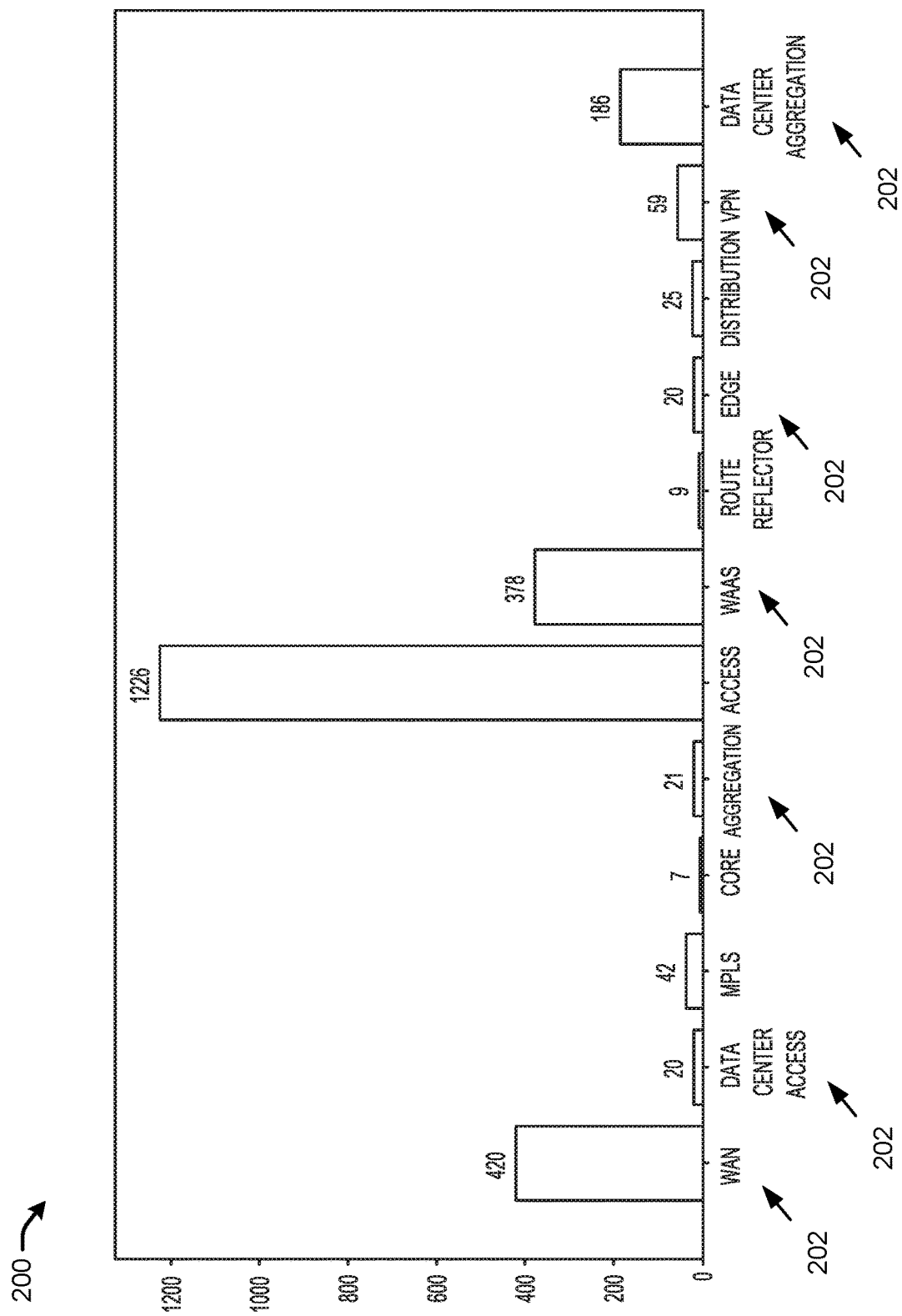
FIG. 2 illustrates an example table illustrating network devices classified by roles.
Figure 3:
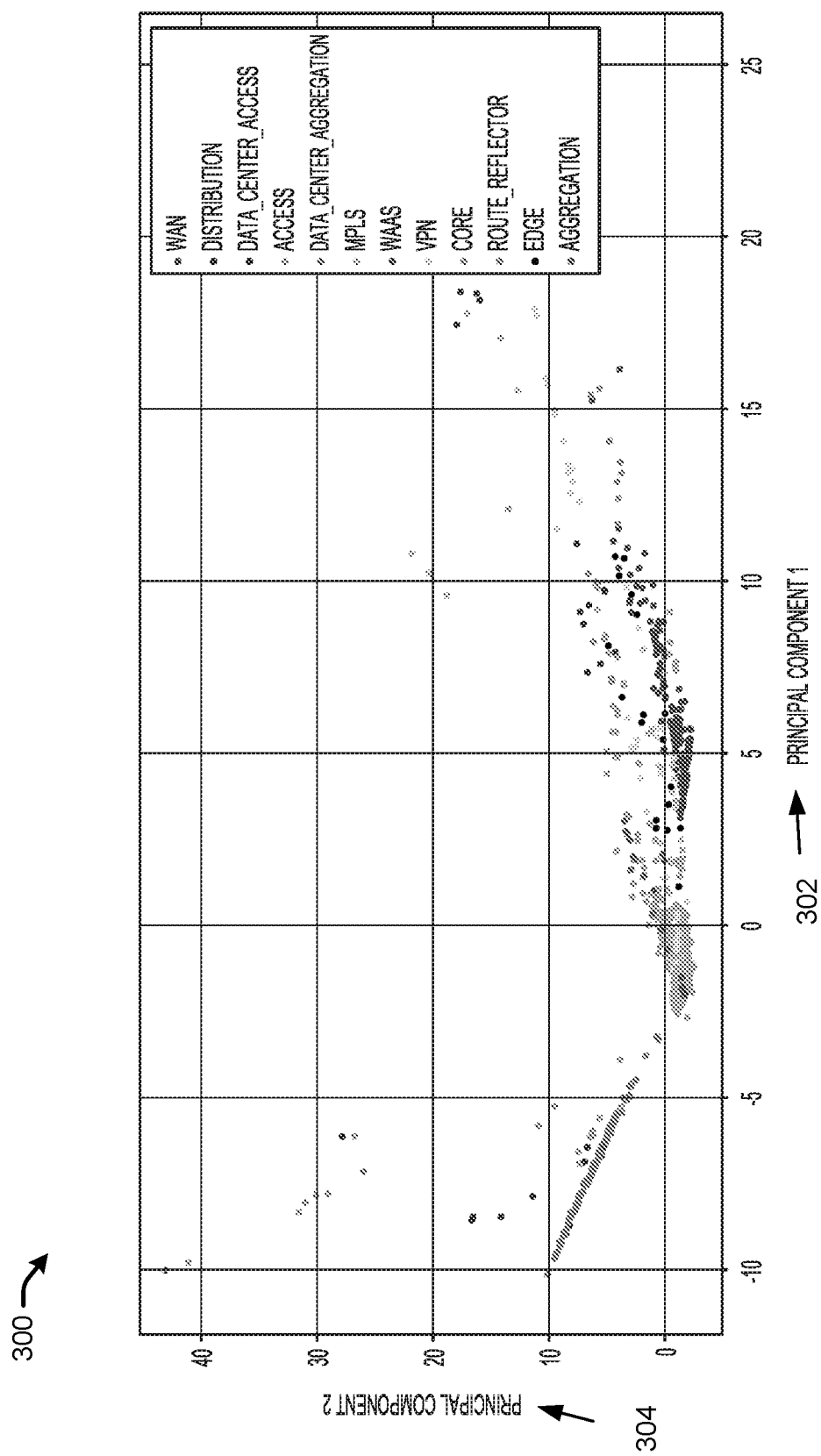
FIG. 3 illustrates an example table where a machine learning model has analyzed and clustered two parsed components of the network devices' configuration by role.
Figure 4A:
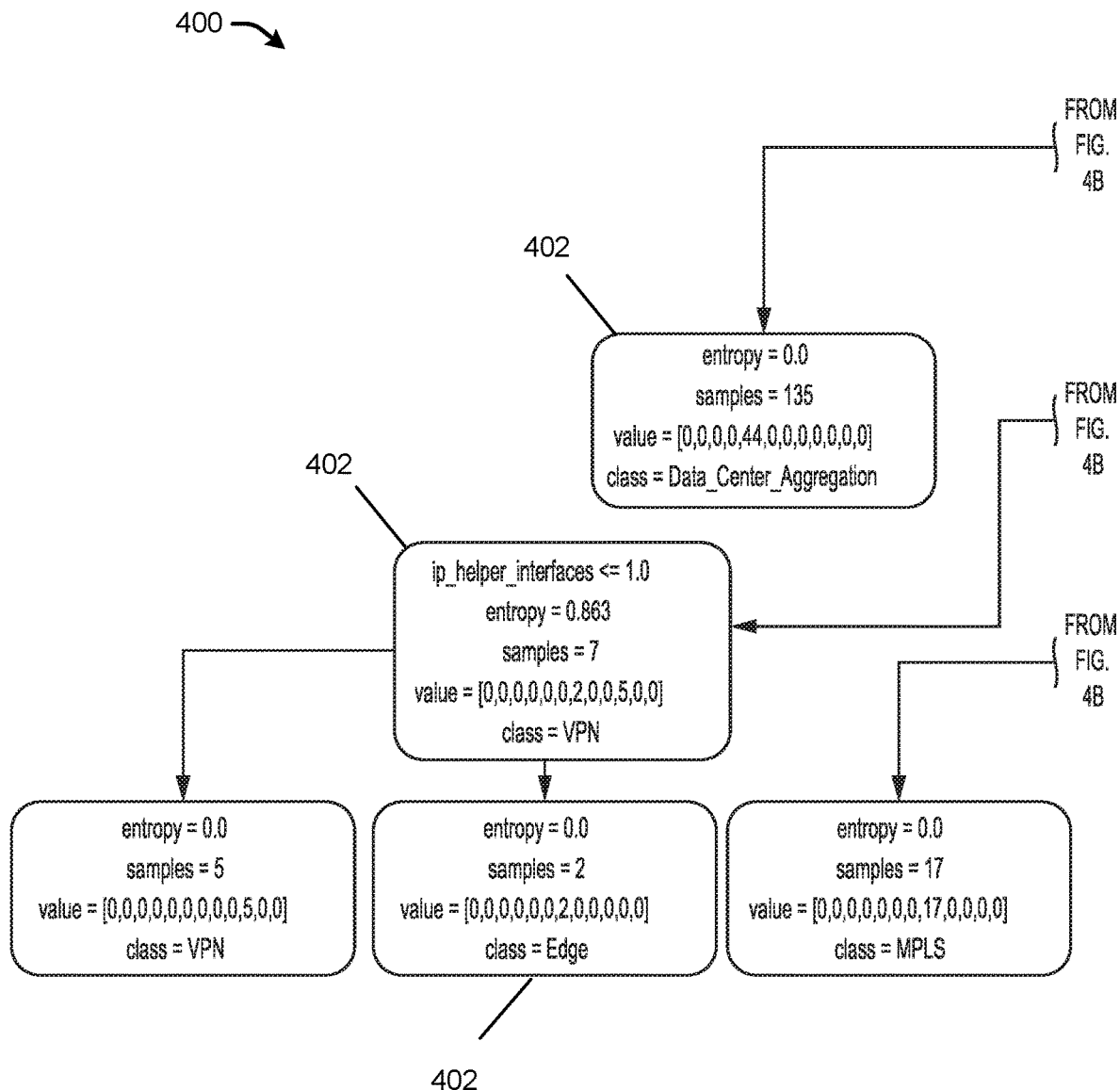
FIGS. 4A-4F illustrates an example of a decision tree from a Random Forest model.
Figure 4B:
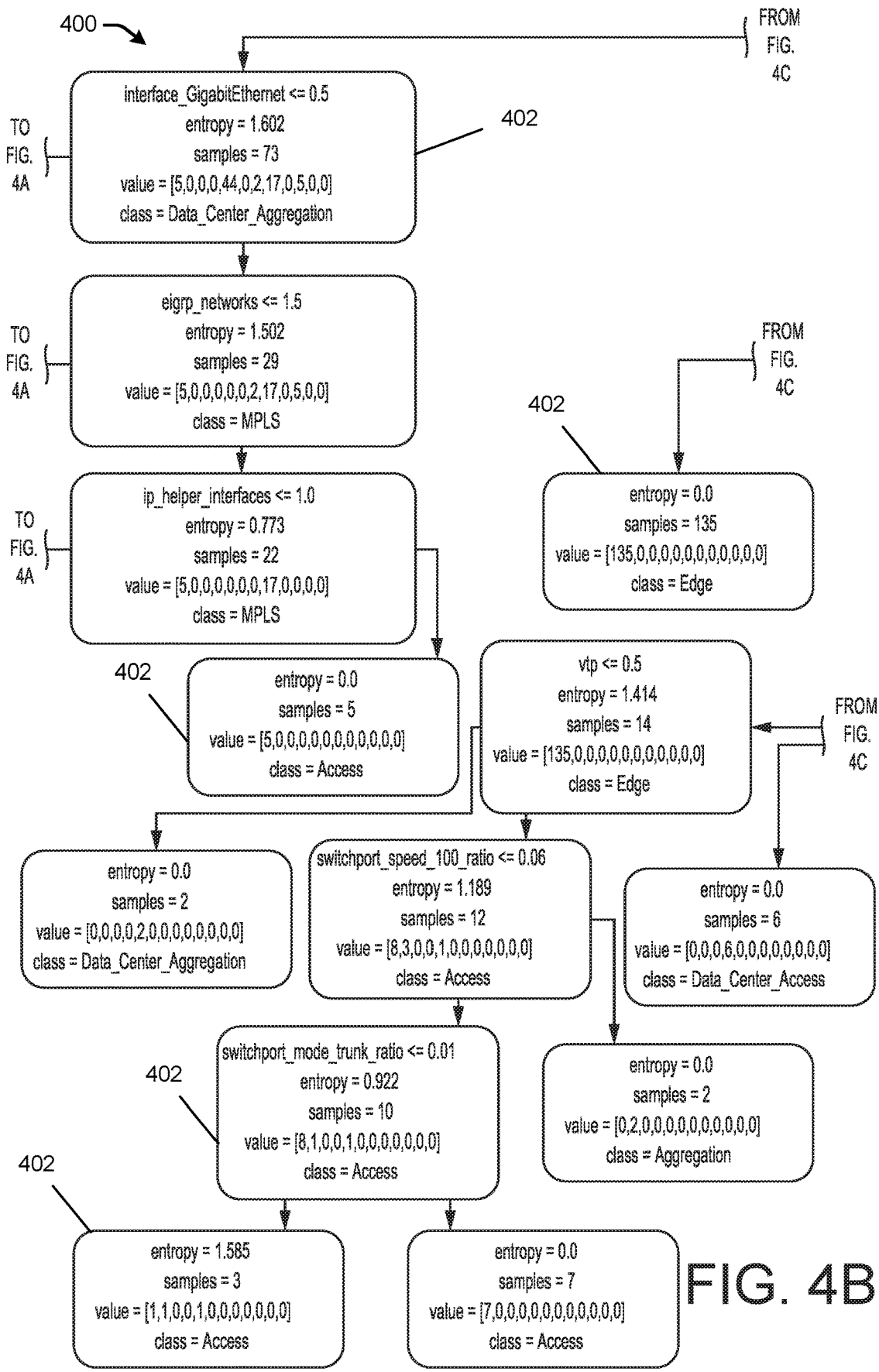
Figure 4C:
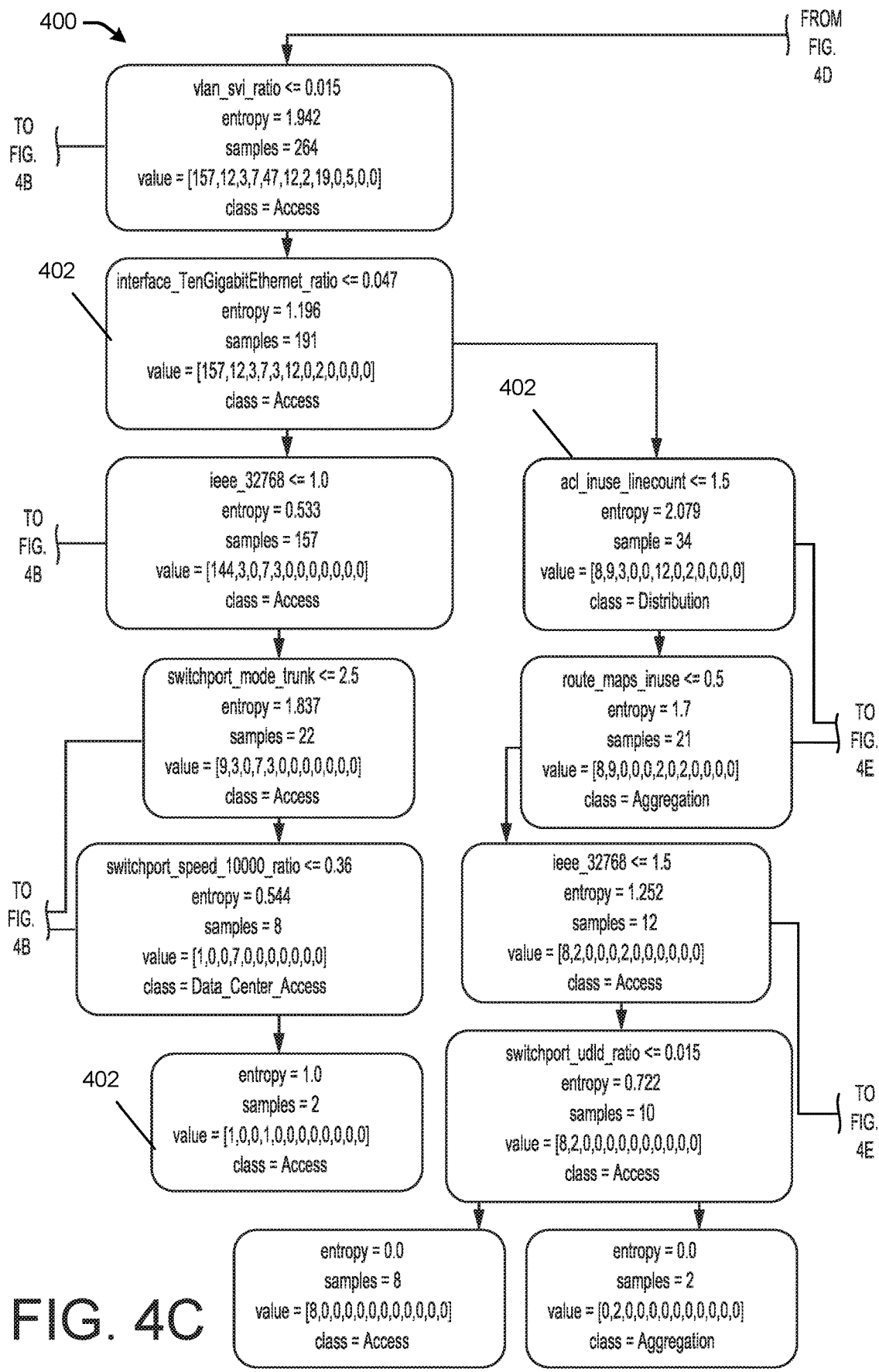
Figure 4D:
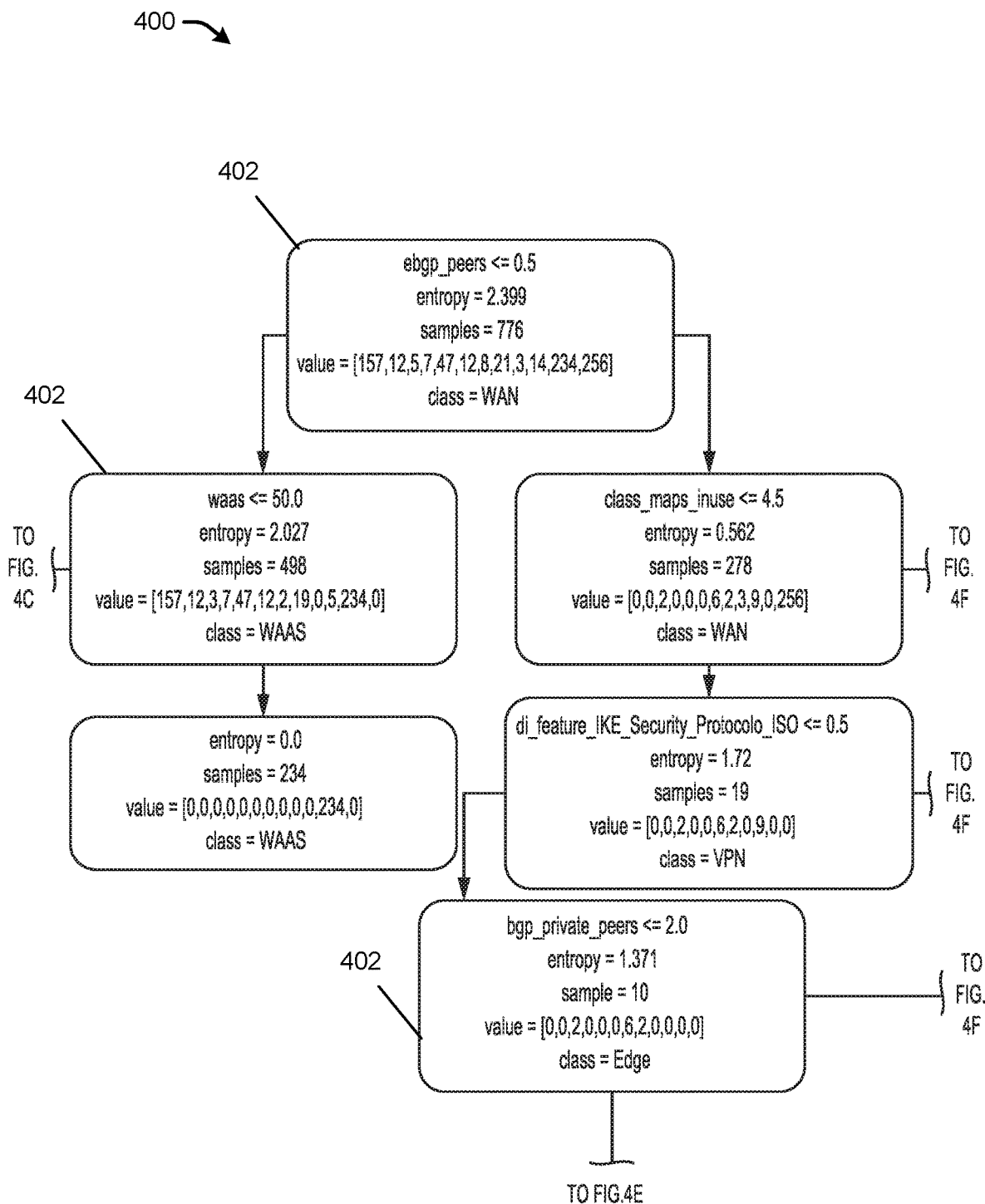
Figure 4E:
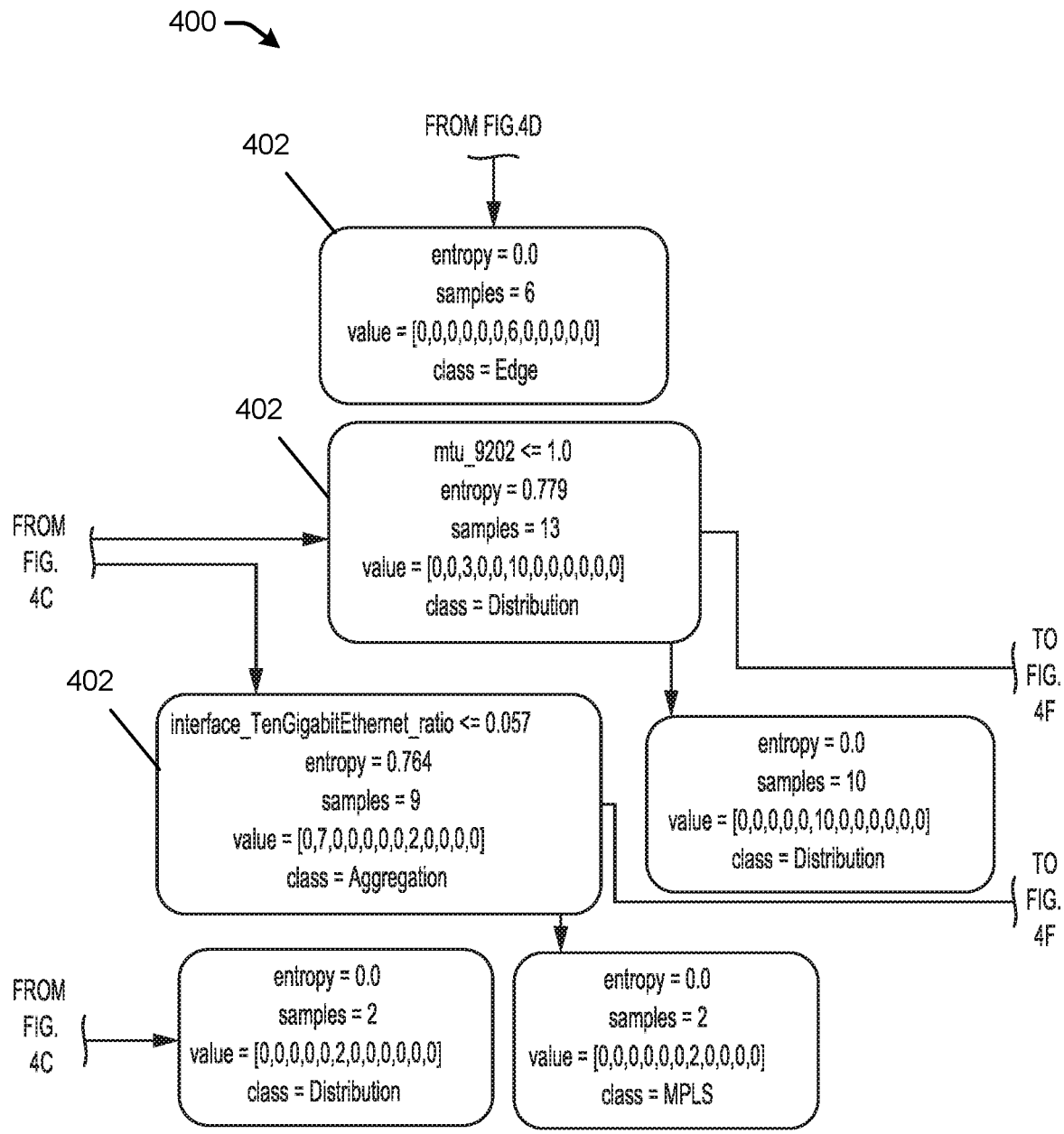
Figure 4F:
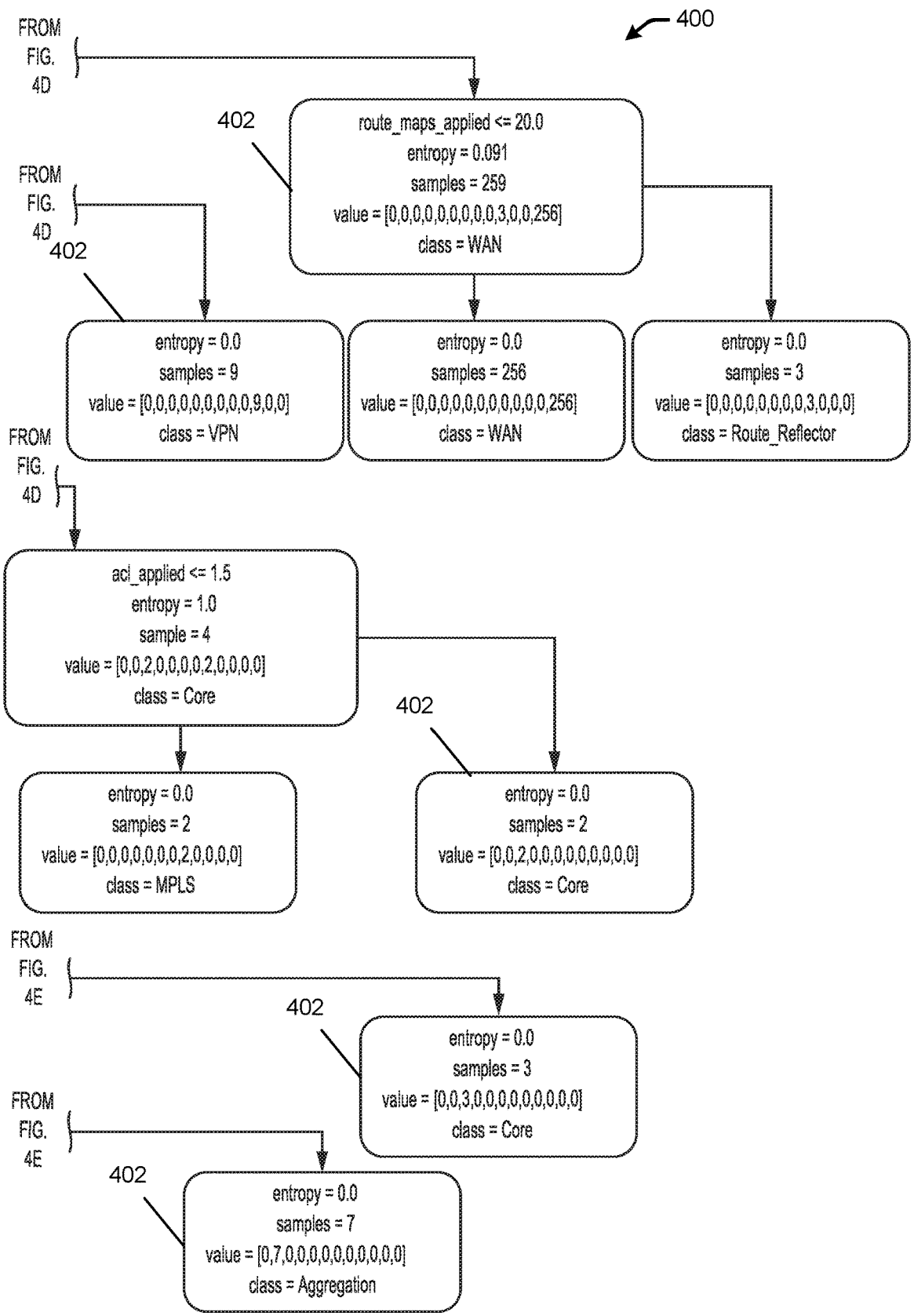

FIG. 2 illustrates an example table 200 illustrating network devices 104 classified by roles 202, e.g., wide area network (WAN), data center access, etc., after using a configuration-to-data-science feature extraction engine 110 (which may be part of the analytics service 108 of FIG. 1 and referred to herein as feature extraction engine 110) utilizing the machine learning model to parse components of the network devices 104 and then analyze the parsed components of the network devices 104. The y-axis provides the number of network devices 104 in the network 100 based on role. FIG. 3 illustrates an example table 300 where the feature extraction engine 110, using the machine learning model, has analyzed and clustered two parsed principal components 302, 304 of the network devices' 104 configuration by role. For example, the network devices' 104 may be analyzed and graphed by the feature extraction model 110 using the machine learning model. As network devices 104 are clustered based on the components that lead to a predicted classifier, insight into themes and similarity of roles and individual devices may be gained. FIG. 3 schematically illustrates basic clustering of network devices 104 and their associated roles, e.g., 202 of FIG. 2. This information may be used to identify outlier network devices 104 for a particular role and show the similarity of the configuration items used by the network operator when assigning a network device 104 a particular task.

As previously noted, the feature extraction engine 110 may serve as the PIN and parse the network devices' configurations into multiple components. The feature extraction engine 110 may use the parsed components and the machine learning model to analyze the parsed components and generate the tables 200, 300 of FIGS. 2 and 3, respectively. Rather than being completely feature driven or relying on an individual to manually classify a network device 104, the PIN predicts the role of networking devices 104 from the machine learning model that was trained against real world deployments of large networks across multiple verticals, theaters, and business sectors. FIGS. 4A-4F illustrate an example of a decision tree 400 that may be provided by a Random Forest model serving as the machine learning model used by the feature extraction model 110 that evaluates curated snippets of configuration and role of interesting observations to classify a network device 104. The data and configurations collected from network operators provide a unique training set for the Random Forest model for the prediction of role and importance of the network devices 104. The training set is used to train the Random Forest model, which may then use the parsed configuration information to evaluate network devices 104 and generate the decision tree 400. The decision tree 400 includes multiple nodes 402 that classify network devices 104 based on the parsed configuration information to classify the network devices 104 with a role, e.g., a role 202.

Examples of configuration information, e.g., parsed configurations, that may be used by the feature extraction and the Random Forest model to help determine a role for a network device 104 include, but are not limited to: marketing features of the device; important features from device importance API; count of "up" interfaces by interface type; ratio of "up" interfaces by interface type; count of interfaces by switchport mode; ratio of switchport modes by interface; count of interfaces by interface speed; count of interfaces by Open Shortest Path First (OSPF) area; count of interfaces in EIGRP; count of FHRP protocols; count of HSRP groups; count of iBGP and eBGP Peers; count of public and private peer BGP Autonomous System Numbers; count of BGP peers by address family; count of VLANs; count of Switched Virtual Interfaces (SVI); ratio of VLANs to SVIs; count of VLANs to STP by STP priority; count of interfaces configured to use root guard; count of interfaces by Service Policy, direction; count and length of applied ACLs; count and priority of VPCs; count of applied Route Maps; count of static routes; count of Netflow destinations; applied QoS Statistics; count of interfaces by ISIS levels; route redistributions; count of applied and configured VRFs; count of interfaces with port security enabled; count of interfaces using 802.1X authentication; interface count by configured MTU; count of interfaces with BFD enabled; BGP next-hop-self, aggregate addresses, maximum-prefix remove-private-as; ratio and count of public IP addresses to private IP addresses; count of interfaces with a voice VLAN; and count of interfaces trusting QoS marking.

As an example, assume that a network device 104 with OSPF enabled is serving a functional role as a WAN router, or some variation of a backbone routing device. This categorization and feature assumption is generally too broad as it misses the syntactical nuance of network device configurations and the reason a network operator configured the device the way it is configured. If multiple datapoints of configuration snippets are analyzed in conjunction, additional context may be gleaned. Perhaps the network device 104 in question is running OSPF and also has 100% of 100 gigabits per second (Gbps) interfaces in OSPF Area 0 and only Area 0, with a high ratio of 100 Gbps interfaces compared to lower throughput interfaces (40 Gbps, 10 Gpbs, 1 Gpbs, 100 Mbps). This provides a much more detailed story of the deployed objective for this network device 104, e.g., that this network device 104 is likely a backbone device of the network 100, and the network operator made a conscious decision to configure this network device 104 in this particular manner with the particular hardware, feature, and configuration options available. Thus, if more than a single feature or configuration of a network device 104 is considered, e.g., a group of features or configurations, more insight into the thought process used to align a network device configuration to business outcome may be realized.

As another example, for examining the network 100, consider a campus switching environment. A traditional approach has been to rely on platform to distinguish what role a network device 104 plays. Vendor business units have an intended use for platforms, the problem is that clients do not always follow this use and given the versatility of various product platforms, a situation may arise where many hardware versions of network devices 104 could fill a particular role. The trained machine learning model focuses on what network devices 104 are actually doing. An example may be a comparison of network devices 104 performing the aggregation role vs. the distribution role. In each respective case the type of network device may be the same and thus, no distinction may be made with respect to role based on that criteria. The distinction between the aggregation role and the distribution role is subtle. Two common approaches that different network solutions may employ is to manually classify a network device's role or to leverage platform to determine a network device's role. Generally, in various network environments, the same set of platforms may be deployed to either of these network roles (aggregation vs. distribution). Attempting to make a distinction between these network roles simply by platform generally does not work. In addition, many of the high-level feature sources, (as an example, vendor configuration syntax documentation) also fail to provide sufficient distinction since the same set of high-level features are deployed across the two roles. For aggregation vs. distribution, the classification attributes that turn out to matter in this case are actual connectivity and the configured state of services, not just in their presence (or lack of presence) in the network 100 configuration. Nuance may be achieved by examining the configuration "sub-features" of a parent feature of a network device 104 that may be configured differently, but from a high level, would appear the same. Configuration syntax specifics provide insight into what the function of the network device 104 is performing in context to the configured state of the network device 104 and relationships around the network device 104 as opposed to just the parent features. For example, an aggregation switch in this design paradigm terminates both L2 trunks and L2 access ports. Since a distribution switch is expected to only terminate trunks, it may be expected that an access-to-trunk port ratio is zero. In addition, associated policy couples may be seen. Access ports also contain 802.1X access control, QoS trust, or marking configuration, indicators that the network device 104 in question is supporting the functionality of an aggregation device.

In configurations, in addition to the role of a network device 104, importance may be calculated based on the presence or absence of particular "key features" that are identified as mission critical network device functions. A second machine learning model, e.g., an importance engine 112 (which may be part of the analytics service 108 of FIG. 1) may be built that calculates the frequency of features for network devices and roles and normalizes the presence of features across the install base by platform. The alignment of key-features-to-role may be determined during model training. When assessing network devices 104 configured with these key features or multiple key features, insight may be gained into how critical a network device is to a business of the network operator, based on the ensemble of configured features. This may allow for prioritization recommendations and additional role context when used to derive design objects for architectural analysis.

The classification identifier of role provides instant context to network engineers of the purpose the network device 104 is performing in the network 100. This initial classification serves as a contextual building block of associating a network device 104 with a function that may be further developed when classifying sub-roles, service boundaries, and other design objects in a mechanized fashion. The importance engine 112 may serve as a prioritization system aiding investigating engineers and assessing impact levels of optimization efforts across the network 100. Additionally, there are intra-role comparisons that are equally interesting. By providing a baseline of the "normal" instances of a particular role, an evaluation may be made to determine if there is deviation from an operator or industry specific instantiation of a role and gain further insight into how operators use configuration(s) to solve a problem.

Thus, in configurations, machine learning is used in conjunction with a dynamic configuration parser that extracts data science features of configuration components of the network devices 104 with business alignment. This extension of machine learning into configuration analysis works towards predicting how a network operator configures a network device 104 or collection of network devices 104 to solve a business problem or need. After the prediction and classification using, for example, the Random Forest Model, clustering technologies are employed to detect outlier and similarity analysis, as previously described. There are a finite number of configurations that a network operator may use based on the options available in the network device 104 and operating system. Associating the collection of configuration options available and in use by the network operator provides insight into the thought process where technology aligns to a business goal. To stress the point, the techniques described herein are not solely based on the feature and the sub-feature analysis to determine a role of a network device 104. The specifics of how the network device 104 are configured, and all the data points that can be extracted from the configuration determine categorical classification buckets that the network device 104 may fall into. The dynamic nature of the parsing takes items into consideration that would require knowledge of the network 100 to drive importance and significance. For example, arbitrary numbers such as VLANs, routing protocol areas, autonomous system numbers, etc. are (for the most part) meaningless in the context of the network device 104 and the operating system. However, these values gain significance as the deployment of the network devices 104 are evaluated across a given network, e.g., network 100. These sub-functions of configuration give further information on how a client deploys functions and takes into account locally significant data that would otherwise be missed in higher level feature comparisons. As an example, how could it be known that a first VLAN is important or more important than a second VLAN? Additional information would be needed into the context of configuration of network devices 104 with and around the first VLAN to determine significance. The dynamic parsing of feature extraction that PIN uses provides for this type of correlation of seemingly unrelated data points.

In configurations, once the roles of the various network devices 104 in the network 100 have been determined, then policies with respect to the network devices 104 may be analyzed. A policy may be a definition of a relationship between network devices 104. In configurations, models may be developed where the models depict relational activity based on network deployment data. As the manners in which network devices 104 interact with each other are determined, predictions may be made as to how service modules should be structured. Such data includes policies, e.g., network operator created segments of metadata, that define the operating functionality of network nodes 102 and the relationships between network nodes 102 network. The end-to-end chaining of policies and relationships establish how network operators implement solutions to meet requirements that solve a business problem. By providing a framework that breaks up the network 100 into the building blocks of design objects, various levels of macro and micro audits across complex networks may be performed. In configurations, RSPA may be stored as elements in a graph database. The graphs preserve intra-device RSPA and become a mechanism to establish intra-device RSPA. In configurations, the RSPA may be captured within categorical containers created using data science and machine learning techniques.

The iterative process of RSPA chaining discovers policy, analyzes the policy at the current container level, and then aggregates data up to the next container level. This process continues to link RSPA chains within and between container levels, establishing a system wide policy representation framework. Analysis leveraging this framework can be performed from micro to macro and any point between. At each layer in the RSPA chain, data is retained, which results in a large set of association rules that describe a network device 104. A policy is the aggregate of its component objects, visually displayed as nodes and edges. A network device 104 is associated with a policy. In configurations, policies on the network device 104 may be evaluated for variance distance by the Jaccard distance of a shingled hash of its graph. A network device 104 is the owner of the policy and has interfaces, protocol processes, and relationships where the network device 104 is configured and applied. References to the policy are stored, along with interface and relationship information as part of the attributes of the network device 104. A role is the collection of network devices 104 that interact with other network devices 104 based on their policies and connectivity. A sub-role is the clustered "theme" of a given role and provides another mechanism for detailed relationship explanation. Sub-roles operate under the notion that there may be subsets of a role that are configured similarly, but different from other subsets of the same role. Service modules (communities) are the "natural" segmentation of how network devices 104 interact with each other. An example of a simplified version of a chain may be "Community 57 is a VPN Technology Community composed of 100 devices with the Role: WAN and have sub-role membership in clusters representing DMVPN, IPSEC/GRE, and GET VPN functions. A particular WAN device has connectivity to a Role: Distribution device and has a routing policy that is redistributing routes into the local office. The route-maps used in redistribution match a particular hash that is used across the environment 95% of the time. A single device contains the metadata that describes where it sits, and how it interacts with all other metadata types."

FIG. 5 schematically illustrates an example of design objects 500 that are derived from the configuration 502 of the network 100. The policies 504 that are associated with a network device 104 indicate the nature of the relationships the network device 104 has with other network devices 104. These network devices 104 aggregate into functional sub-roles 506 based on their PIN and ultimately into a collection of functional roles 508 that define a service module or community 510. Service modules 510 are the logical grouping of network devices 104 that perform a similar task or are complementary to each other's functions based on particular relationships. Modular design reduces the complexity of the network 100 by providing a uniform template to implement a given solution that solves a business need. In the context of computer networks, such service modules 510 are sets of network devices 104 that serve some business purpose. An example may be a "branch" or remote office location. For example, the network 100 may contain 500 branch locations, e.g., "sub-networks," with different variations of deployed hardware and features. Service module discovery allows for the identification of themes that make branch locations similar, but also highlight differences in service module deployment. This type of service module distinction may act as the basis for a well-designed network.

Policies 504 are the lowest ordered building block in the RSPA framework. A policy analysis engine 114 (which may be part of the analytics service 108 of FIG. 1) converts complex policy from text configurations and creates a graph representation of the relationships of the components. As the process pans out and aggregates these policies into relationships between network devices 104 and service modules 510, the context of component relationship remains to build the chain.

As previously noted, role 508 is determined using PIN. PIN parses the configuration and feature list 502 of a network device 104 and makes a prediction on the role 508 and, in some configurations, importance against the Random Forest model described previously. The differentiator of the PIN approach is that it uses how a feature of the network device 104 is configured and information/metadata about the network device's state to determine role 508. The above example of "a device running OSPF is interesting, but a device with all of its interfaces in OSPF area 0" makes the network device 104 more important and provides meaningful context that the network operator configured OSPF a certain way to fulfill a certain function and that function ties back to the role 508 classification. The role 508 classification is made from hundreds and thousands of these extracted feature types, curated by domain experts that map to a deliberate client configuration decision to fulfill a business need.

Sub-role 506 is the clustering of similarity between network devices 506 of a particular role 508 based on their distribution of advanced feature extraction. The sub-role 506 becomes an additional classifier that allows for the making of more detailed associations of a generic role 508. Sub-roles 506 are used to identify the real-world deployment variations that exist within the roles 508 seen in client networks, e.g., network 100. Access layer in a data center module may be configured and use features differently from a traditional campus access layer. All WAN routers are not created equally. Some may be used as VPN, SD-WAN, etc. Sub-roles 506 provide another vector to understand how clients map technology solutions to solve business problems and allow contextual granularity in the ability to classify network device functionality.

Service module or community analysis provides insight into the relationships that exist between nodes in a network, e.g., nodes 102 of network 100. The policy analysis engine 114 profiles configuration and shows command output to establish relationship information inventories where relationships among nodes 102 exist, where policies 504 exist, and the interfaces that connect network devices 104 where those policies 504 exist. This information, parsed from configurations 502, or available from things such as the network controller API, allows for not only plotting the connectivity between network devices 104, but also mapping policies 504 directly onto these edges. The graph of the client environment may then be modeled based on the levels of service module 510 desired to be evaluated since just like people, network devices 104 can belong to multiple communities, e.g., service modules 510. Local communities or service modules 510 focus on directly connected and physically connected neighbors via CDP/LLDP. Regional communities or service modules 510 represent OSI Layer 3 level communities and relative regions (geolocation) communities. Technology communities or service modules 510 represent feature of technology communities.

As a further example, a network device 104 configured as a WAN device will have physical community membership with network devices 104 the WAN device is physically connected to and provides services for other network devices 104 (e.g., DHCP, FHRP, etc.). The WAN device may participate in a regional community where the WAN device is a fail through router for WAN traffic in the Southeastern United States with other BGP peers, and the WAN device may participate in a smaller community of DMVPN spokes that terminate at a DMVPN hub.

As the relationship and policy association goes from device-specific to the community level, detailed information on the device may be provided and comparisons may be made of how services are deployed by evaluating the association rules that were detected for a network device 104. Using the specific communities allows for the creation of these association rules in a method where "apples-to-apples" communities may be compared.

Communities are thus derived on the basis of devices in the service module 510 (community), how they have relationships to other devices, the services used, and policies applied in those communities. Since community membership is not singular, comparison analysis and insights are derived after community membership is determined. This ensures that communities of similar size and function are compared, as opposed to something such as a small branch location compared to a data center.

Inside a given service module 510, the relational data that exists for nodes 102 in the network 100 may be defined by describing how network devices 104 have knowledge or connectivity to other network devices 104. The process may start at a network device 104, describe what is known about that network device 104 and how that network device 104 is connected to other network devices 104. This descriptive data of the nodes 102 and their surroundings is important in finding patterns of relationships in the later steps. The attributes of the network devices 104 and their connectivity are converted into a one-hot encoding to determine the relational rules. This one-hot table is expanded across all of the client network devices 104 and thousands of variable possibilities that all stem from configuration options a network operator may use to connect or create relationships between network devices 104.

Market Basket Analysis (MBA) may be used to find patterns of association and determine high confidence association rules. The Apriori algorithm may be used to identify frequent sets of data that create these relational rules. MBA is rooted in the behavioral habits based on purchasing. For example, purchasing habits of customers can indicate products that are complementary to each other are often purchased in the same visit, therefore establishing correlation and patterns of the frequency one could expect to see individual items bought together. This analysis is translated into the network realm to identify how clients configure network devices 104 and their relationships to solve a problem or fulfill a design requirement. Understanding patterns with a strong confidence provides the ability to identify areas that are out of scope with inferred "good design." For example, 100% of the time, distribution devices are physically connected to access devices and core devices (summary level rule) and 97% of the time, when an access layer device is physically connected to distribution devices that are running HSRP and connected to core devices, there is the policy "LAN-QoS-In" applied on the interfaces, and the version of the policy is "22" (detailed level rule). These rules are combinations of antecedents and consequents, where the combination of beginning attributes (antecedents) leads to the presence of some other attribute (consequents). The number of each of these increase the depth and specificity of the relationship. Summary level rules may be used for general network insight and statistics, where detailed rules provide the level of depth needed to perform complex predictions. All the community involvement that a network device 104 has when building out association rules may be collapsed. As the functions of the network device 104 are described and how the network device 104 is related to everything else, two interesting items may be developed: a general summarization based on very detailed information of how a client deploys network solutions; and the ability to identify deviations from strong patterns that are recognized as prevailing network design objects across the network 100. These patterns that are discovered from inferred relationship allow for making detailed recommendations based on microcomparisons of association rules across similar service modules 510 (communities).

Figure 6:
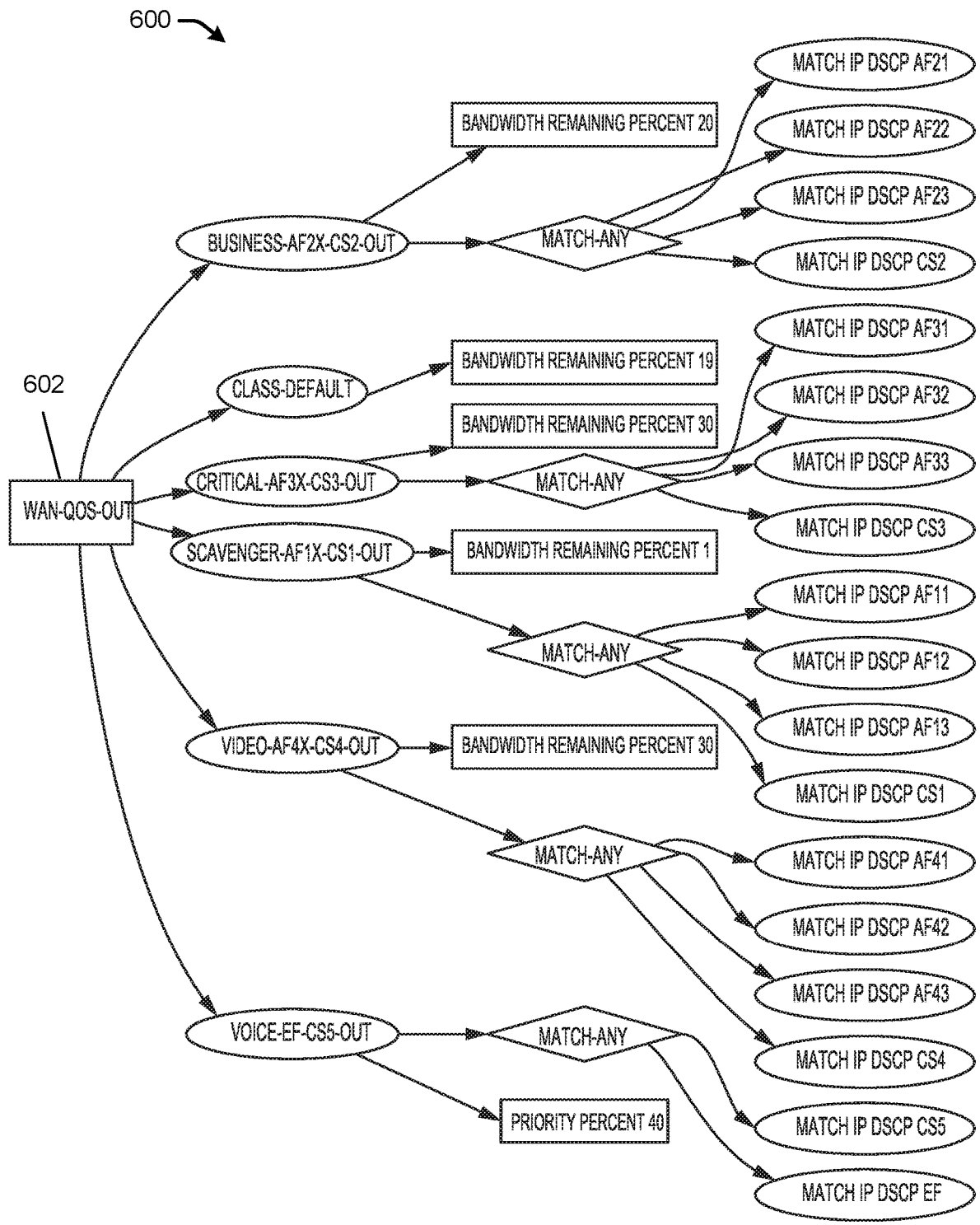
FIG. 6 schematically illustrates an example conversion of a Quality of Service policy to a graph structure.

For example, FIG. 6 schematically illustrates an example conversion of a WAN-QoS policy 602 to a graph structure 600. This graph structure represents an intra network device 104 view of an RSPA policy chain. This particular representation is of a Quality of Service model deployed on a WAN router. The use of a graph gives easier understanding of a policy that may span several different locations inside a configuration and also gives the ability to perform distance calculations for audit purposes of similar policy objects.

Figure 7:
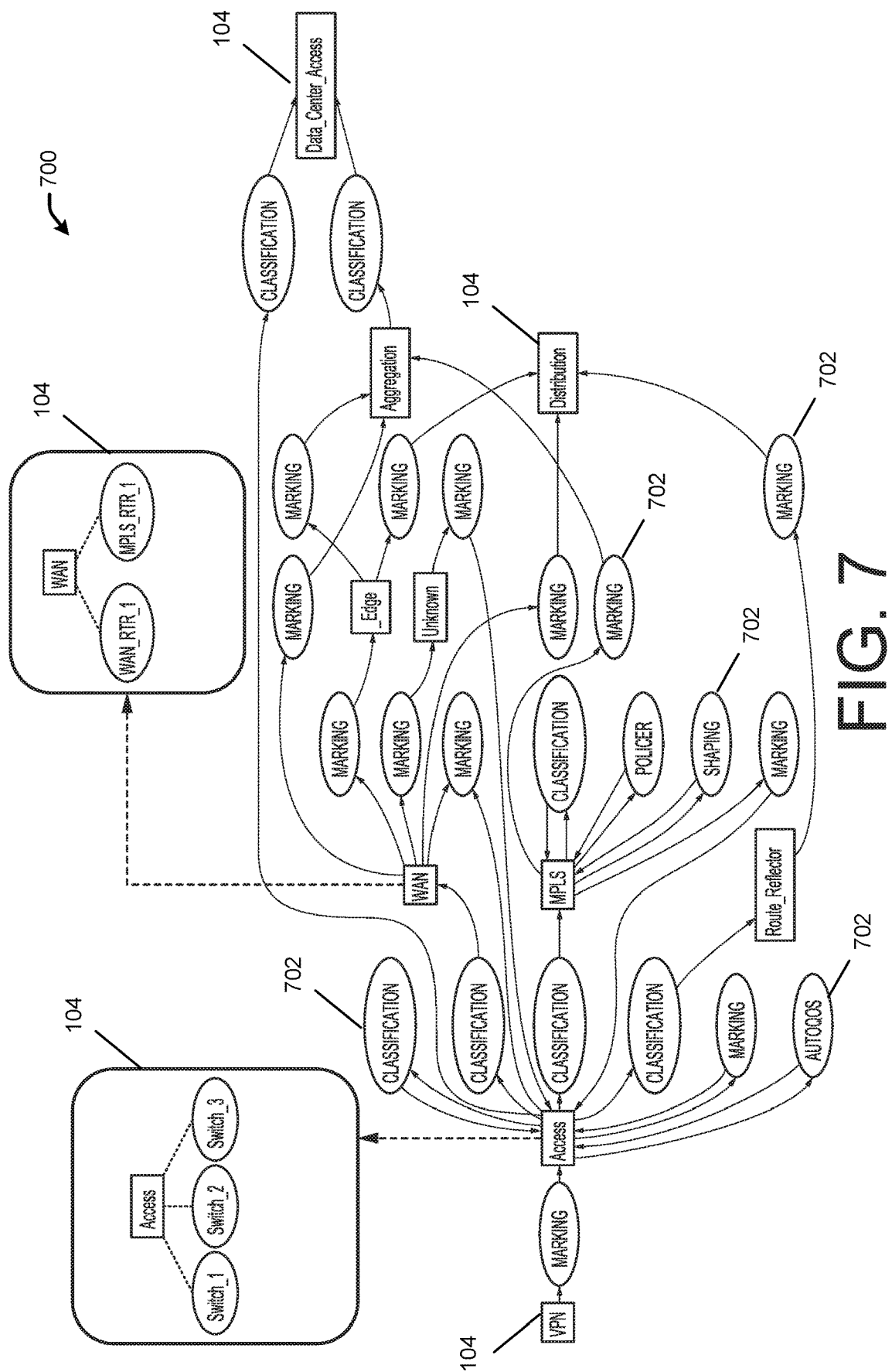
FIG. 7 schematically illustrates an example association of network devices into functional roles and the relationships.

FIG. 7 schematically illustrates an example graph 700 depicting the association of network devices 104 into functional roles, e.g., roles 202, and the relationships 702 that exist between different role types based on the policies, e.g., policies 504, and connections that exist between network devices 104. By examining how network devices 104 are related, insight may be gained into how the policy attributes chain throughout a service module 510 and across the network 100. This chaining of attributes and relationship is important in that it defines the end to end flow of applications and technologies used to accomplish business outcomes. These attributes function as the framework and building blocks for future solution and design comparison engines.

As this association of policies 504 and relationships 702 is further aggregated, the boundaries of service modules 510 of network devices 104 that share relational qualities may be determined. The use of service modules 510 finds patterns of how network devices 104 are associated to each other and may serve as the basis for which service modules 510 may be compared through the sum of RSPA components. This RSPA framework provides the capability to compare complex design scenarios and perform distance calculations on the components, e.g., network devices 104, that make up a particular service module 510.

Figure 8:
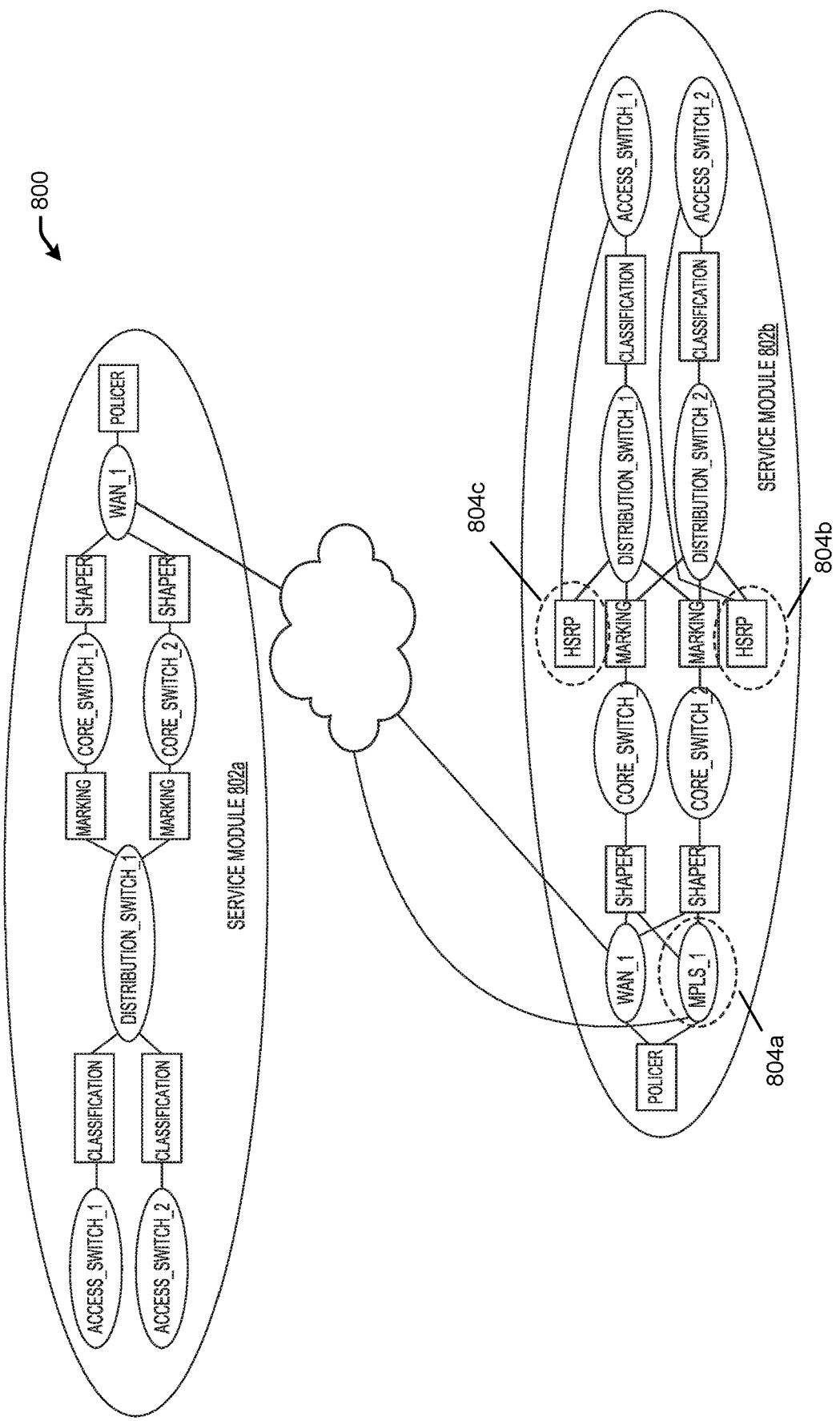
FIG. 8 schematically illustrates an example comparison of service modules.

Continuing with the example of 500 branches from above, service module (community) analysis may identify several branch network service modules 510 based on the relationships and policies that are applied between network devices 104 at the branch. The aggregation of RSPA data allows for the comparison of the service modules to look for deviation across multiple variables. FIG. 8 schematically illustrates an example comparison of service modules 802a, 802b and the findings that service module 802 is missing redundant network device roles 804a, 804b, 804c that are "typical" in the network operator's branch design. The outcome of such an analysis may directly translate into a "Bill of Materials" or configuration playbook needed to bring the outlier service module, e.g., service module 802a, into compliance with the intended network design.

The policy analysis engine 114 may provide the mechanized module analysis by understanding the association of policies configured on and between network devices 104 and how these network devices 104 are associated through relational connectivity and traditional networking protocols. Thus, normalized service modules 510 comprising nodes 102 may be established and may then be compared to other service modules 510 across the network operator's deployment throughout the network 100 or against validated designs for mechanized solution level optimization and audit capabilities.

Figure 9:
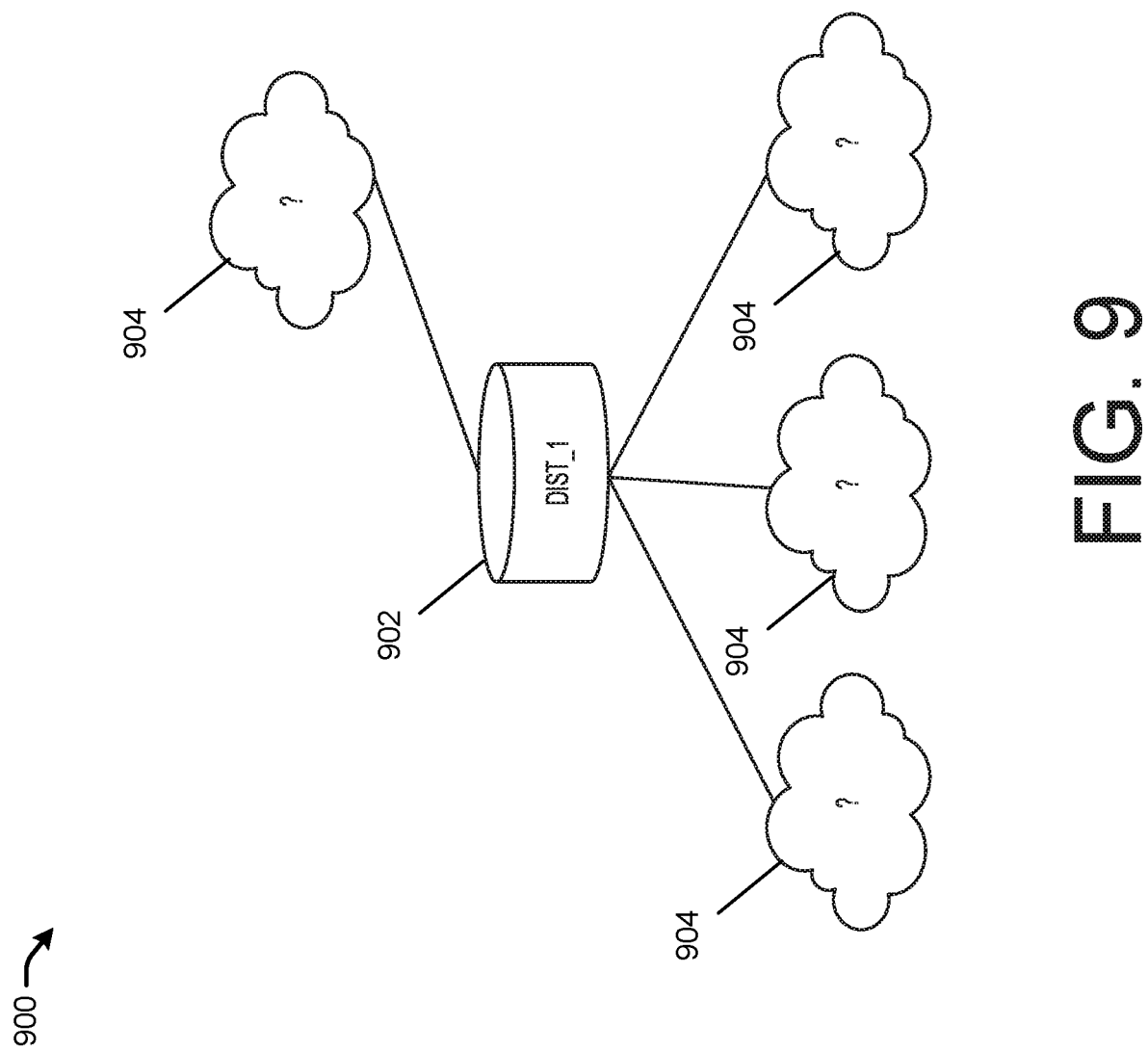
FIG. 9 schematically illustrates an example of a network device without the relationships or dependencies with respect to other network devices.
Figure 10:
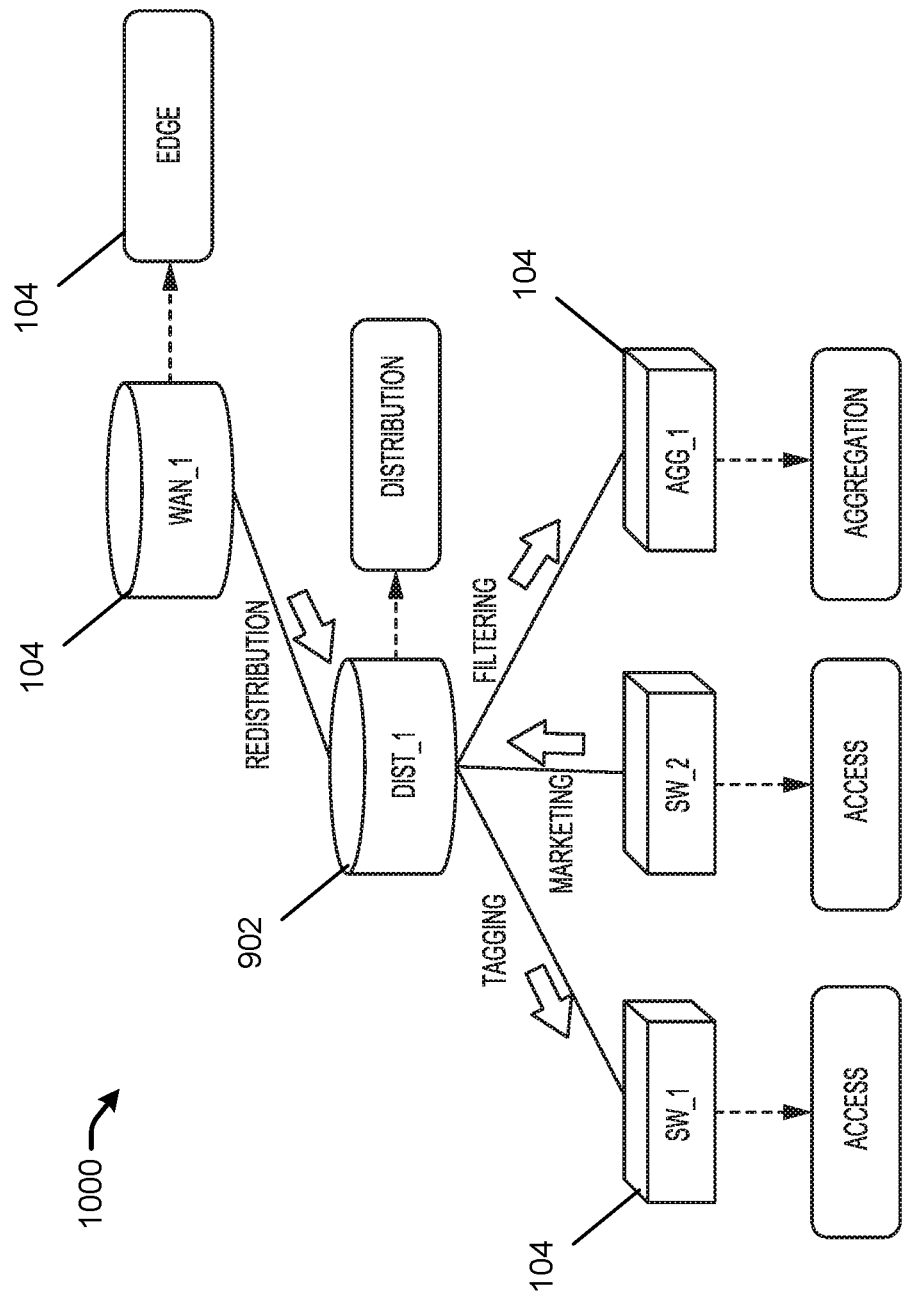
FIG. 10 schematically illustrates an example application of service module and Relational State of Policy Attributes (RSPA) data as an overlay to an inbound network analysis case.

An example use-case of the framework to add insights and context to environment is through the opening and processing of technical support requests and customer support ticketing systems. As shown in FIG. 9, often the name and configuration of a network device 902 (which may correspond to a network device 104 of FIG. 1) are provided to network engineers, e.g., in a technical support request, but the relationships or dependencies 904 that the network device 104 has or influences with respect to other network devices 104 are not explained. Knowing the relationships that exist in a service module between different network devices 104 and the roles the network devices play in the service module provides context to the network operator and may help with case resolution. FIG. 10 schematically illustrates the application of service module and RSPA data as an overlay to an inbound network analysis case for network device 902. The representation of policy flow, relationships, and roles provides additional context to a network engineer of the dependencies and configurations that may be influenced from other network devices 104. For example, other network devices 104 and their relationship with network device 902.

In configurations, the policy analysis engine 114 that parses and creates the design objects is not vendor specific and the RSPA chaining mechanism may also be used prior to deployment of the network 100 to estimate materials and configuration for greenfield or brownfield deployments. For example, ingesting the configurations of an operating network using various types of network devices from various sources, vendors, manufacturers, etc. and developing the chain of policies across service modules provides the ability to identify replacement configuration and network devices to analyze a given design. While this may easily apply to a small number of network devices 104 as a manual process, performing such a transaction across hundreds or thousands of network devices 104 quickly escalates into a scaling problem.

In an Internet of Things (IoT) scenario, there is a concept of Manufacturer Usage Description (MUD) where a sensor device is provided instructions on its individual access rules based on the device's manufacturer specifications. In a similar context, service module discovery may serve an audit purpose on change control both in IoT settings and traditional network environments. Rather than relying on a set of instructions from the manufacturer, service module discovery learns the expected behavior of a community of devices. This learned state may then be evaluated against proposed configuration changes to identify if there is a change in policy flow and RSPA chains inside of the service module. The service module discovery acts as an on-demand audit of the chain of policies that exist in a given service module of a network device 104.

Once the roles have been discovered and the policy/communication flows, e.g., RSPA, among the network devices have been determined, the roles and RSPA may be used as building blocks to analyze and/or validate implementation of network design solutions, e.g., comparing a network's configuration with a network design solution. Using design documentation (e.g., high level design (HLD), low level design (LLD), manufacturer/supplier/vendor design guides, any design reference documentation, etc.), the policy analysis engine 114 extracts RSPA chains across service modules, as previously described, which captures the solution implementation logic. In particular, as the logic components of a particular network solution are processed, the components are passed into the framework to aggregate and summarize the interaction of policies and relationships across the network environment represented in the network solution documentation, e.g., network solution documentation that describes a network solution for implementing a network to achieve one or more business goals. The digitized collection of multi-vendor, multi-technology solutions serves as a reference point to which network operator deployed network solutions may be compared for validation, compliance, etc. This enables automated identification of deployed network design solutions in a network operator environment. Since both the network design catalog and network operator deployment data are fed into the standardized framework, it is possible to compare how vendor solutions are deployed in production networks. Such a unified design object framework allows for new insights into solution implementation, auditing, and compliance remediation across thousands or tens of thousands of network devices 104.

Figure 11A:
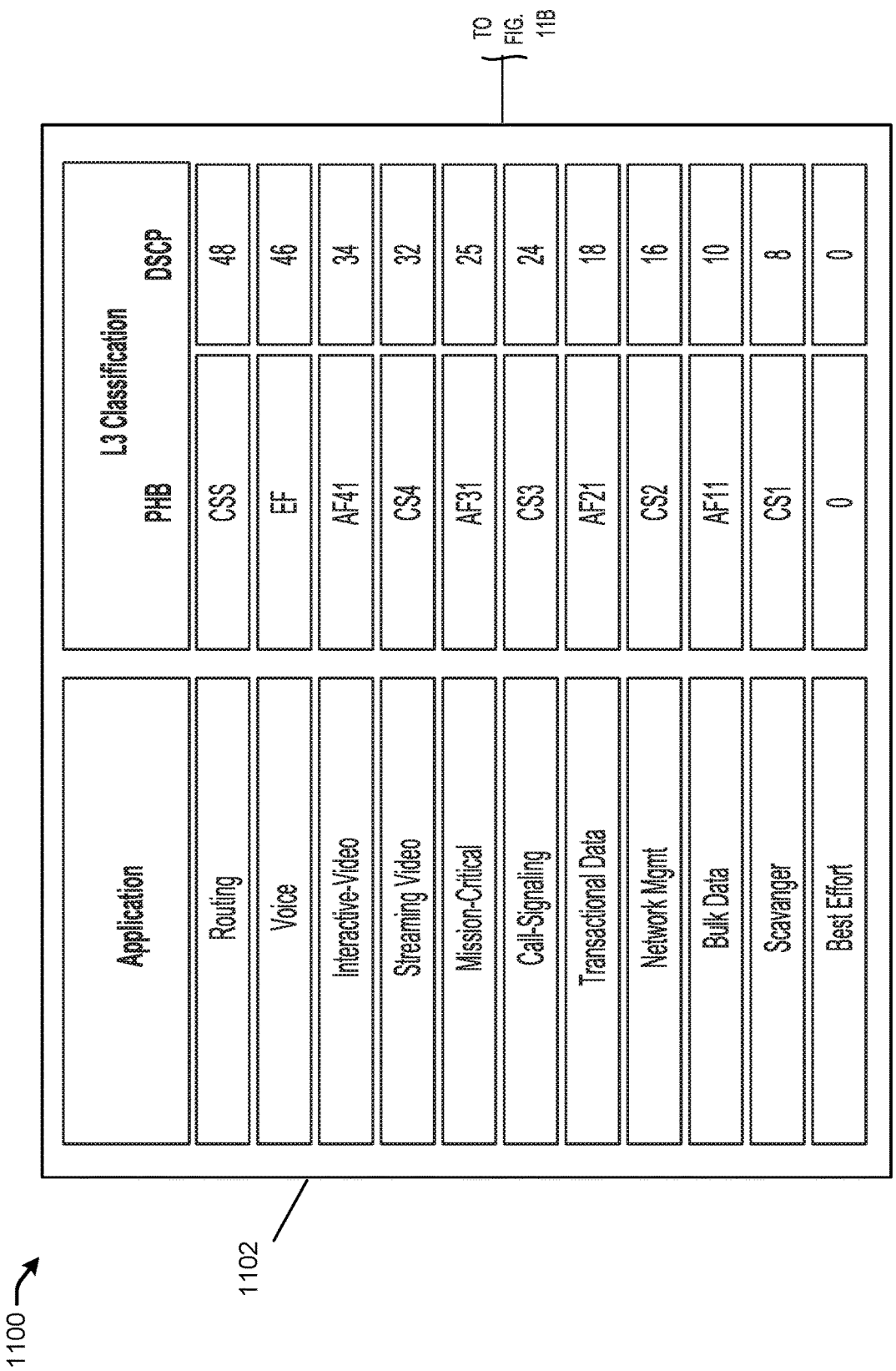
FIGS. 11A-11E schematically illustrates an example process of transforming a design document into code snippets that are then converted into a graph of design objects.
Figure 11B:
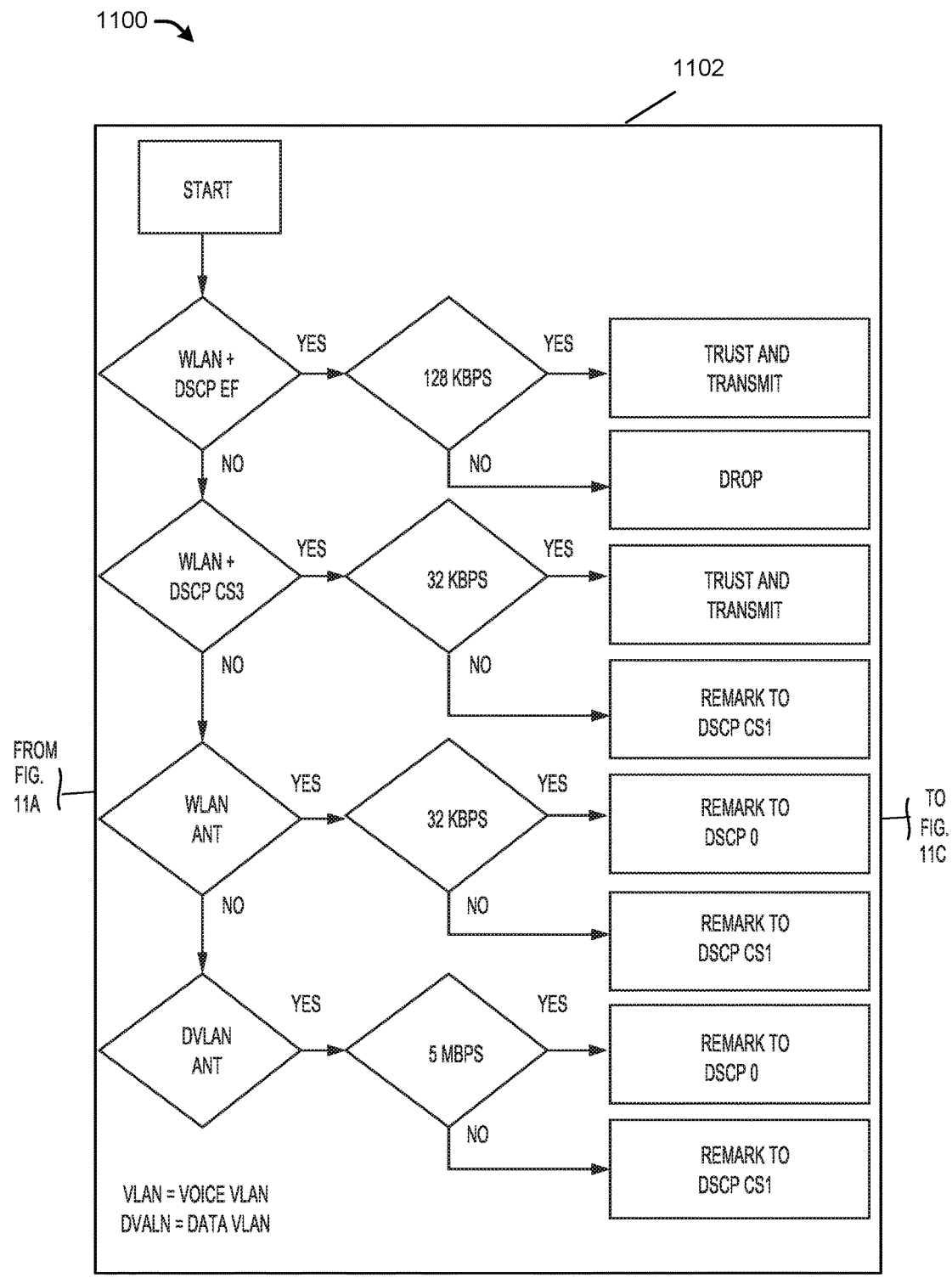
Figure 11C:
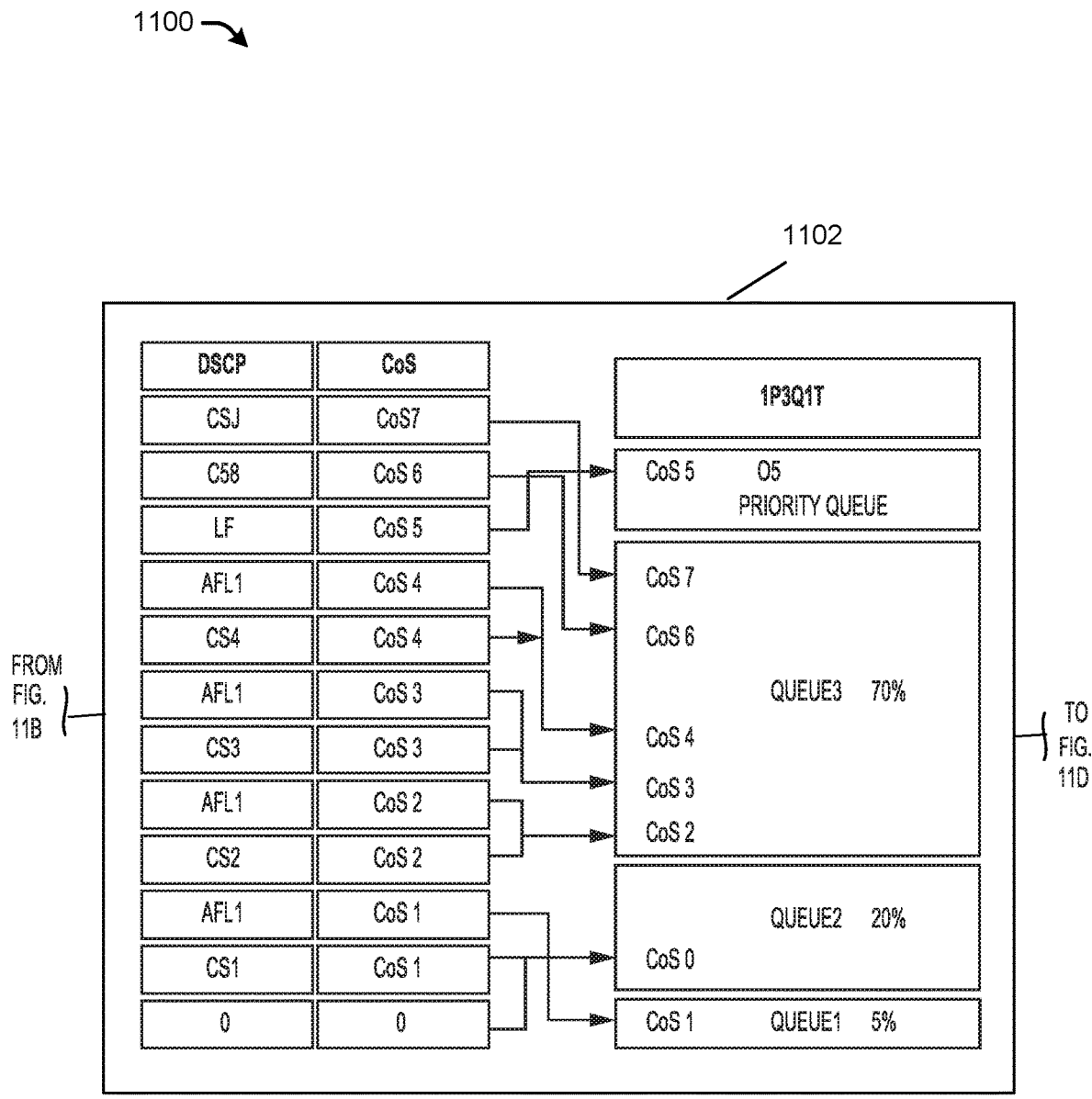
Figure 11D:
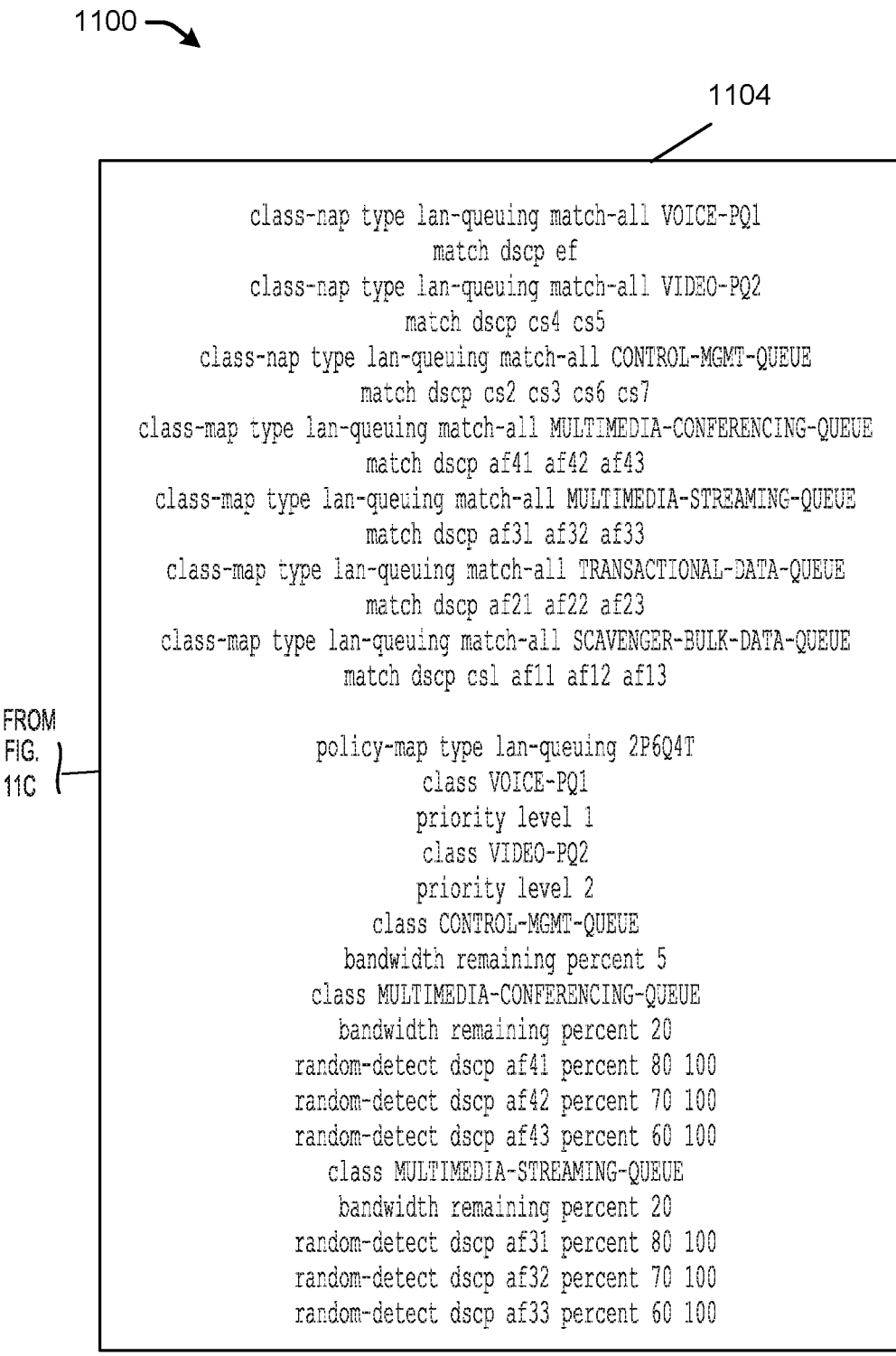
Figure 11E:
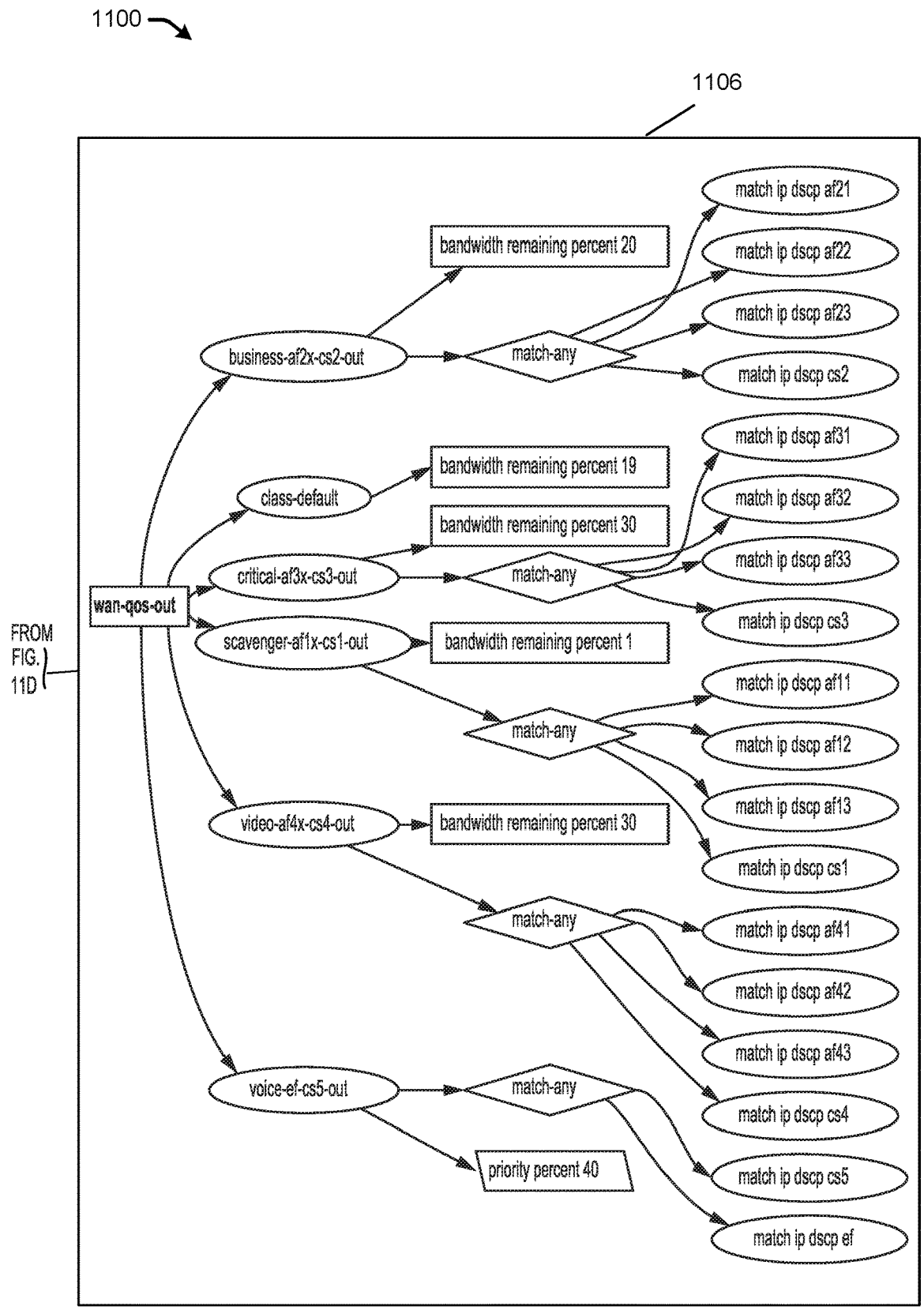

FIGS. 11A-11E schematically illustrate an example process 1100 of transforming a design document 1102 into code snippets 1104, which are then converted into a graph 1106 of design objects, as previously described. FIGS. 11A-11C schematically illustrate the design document 1102. FIG. 11D schematically illustrates the code snippets 1104. FIG. 11E schematically illustrates the resulting graph 1106.

The graph 1106 of design objects provides the building blocks of defining the relationship that configuration components use to link the role and boundaries of a network solution to individual network device contributions to a deployed network solution. A document analysis engine 116 (which may be part of the analytics service 108 of FIG. 1) performs the process 1100 using a machine learning model.

By comparing the graph database inferred from the digitized design document, a query of the patterns of policy-to-role and other component relationships may be evaluated and compared to the deployed network environment. Distance calculations of the policy and device nodes matching the design graph provide insight into the percent of the solution that was identified in the implemented network design. Thus, from a compliance and audit capability, the network operator gains insight into complex evaluations of the relational characteristics of how the "as-built" network environment is configured vs. various "as-designed" solutions. For network solutions that could span hundreds or thousands of devices and links, this is a task that simply does not scale in the current manual instantiation. The benefits of this comparative framework are not limited to network operators. Anyone that publishes design documents (solution validation teams, technical writing and engineering teams) may benefit from this approach to see how exactly clients deploy network solutions or combinations of network solutions to solve business problems. This allows for more flexibility in shaping product and feature needs to meet the demands of the users through advanced analytics.

Figure 12:
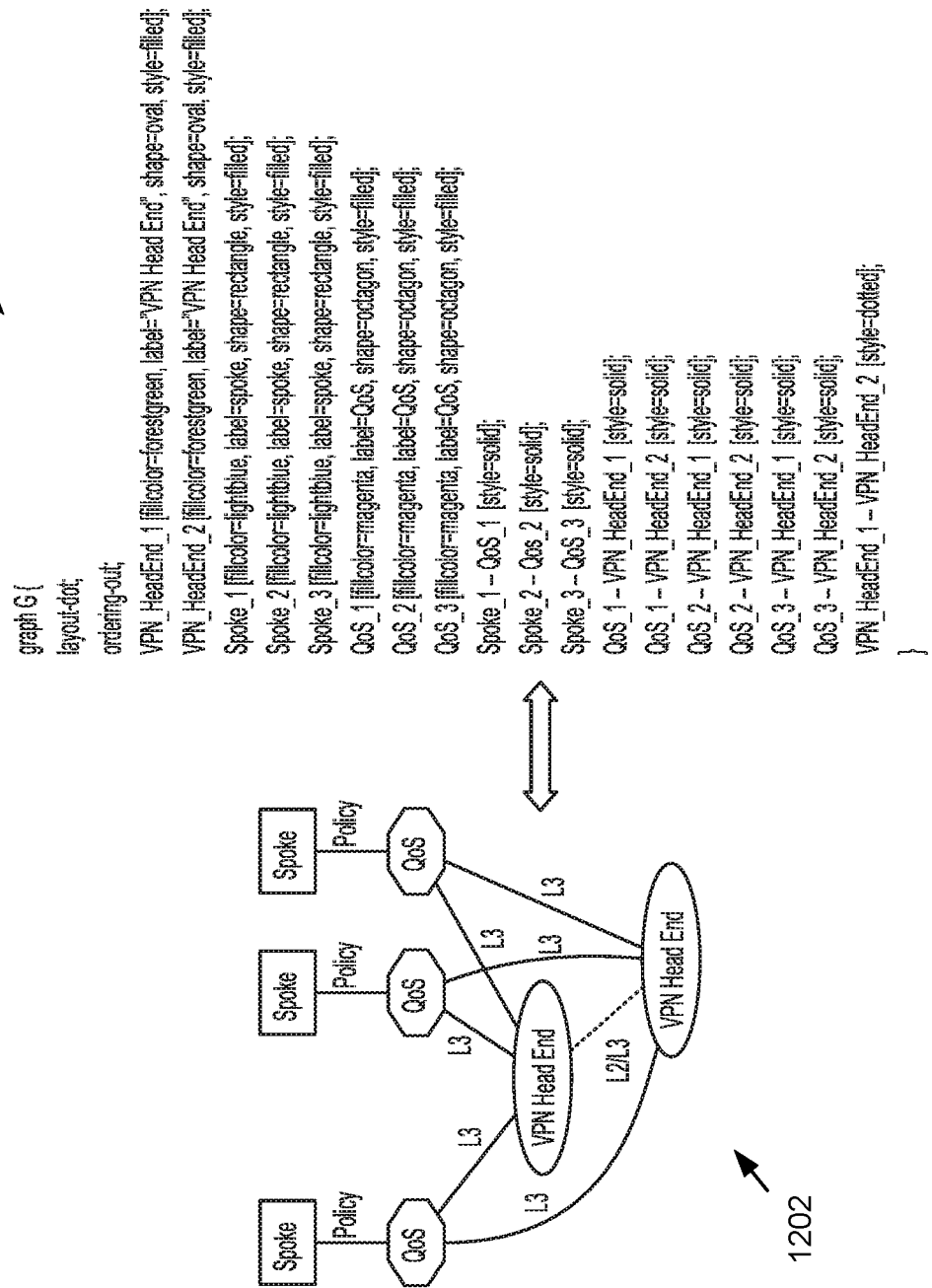
FIG. 12 schematically illustrates an example inference and digitization of relationships discovered in a network.

A comparison of the graph design objects by the document analysis engine 116 involves finding one or more design solution object graphs within the overall design object graph 1106. FIG. 12 schematically illustrates an example of inference and digitization of the relationships discovered in a network, e.g., network 100, arranged as a graph 1202 as described herein and the digitization 1204 into a design framework. Being that both the validated design document, e.g., document 1102, and the network 100 are now utilizing the same design framework, a distance calculation with respect to components of the network 100 and the components defined in the document 1102 may be made to evaluate the compliance or deviation of the network environment directly against the validated or proposed design presented in document 1102.

As an example, a VPN solution may be comprised of several branch locations that are configured with particular Quality of Service (QoS), tunneling, routing, and security policies between their per-location routers, and the head end VPN routers located at the company headquarters. By comparing the graph database, e.g., the graph 1202, inferred from the digitized design document, a query of the patterns of policy-to-role and other component relationships may be evaluated and compared to the deployed network environment, e.g., network 100. Distance calculations of the policy and network device nodes matching the design graph 1202 provides insight into the percent of the network solution that was identified in the implemented network design outlined in document 1102. The document analysis engine 116 may make sub-set audits of a network environment by comparing the relational chains of network design objects in the topology. The document analysis engine 116, using a machine learning model such as, for example, a Random Forest model, is able to identify the patterns of the relational chains of network policy and roles of network devices 104, and thus finds the compliance or deviation of the network designs in other portions of the network 100. This allows for an audit of repeatable network designs across a network environment. Thus, the document analysis engine 116 is able to identify a network's design deviation from a validated network design, e.g., document 1102, by breaking down relationships into the components as defined herein.

Figure 13:
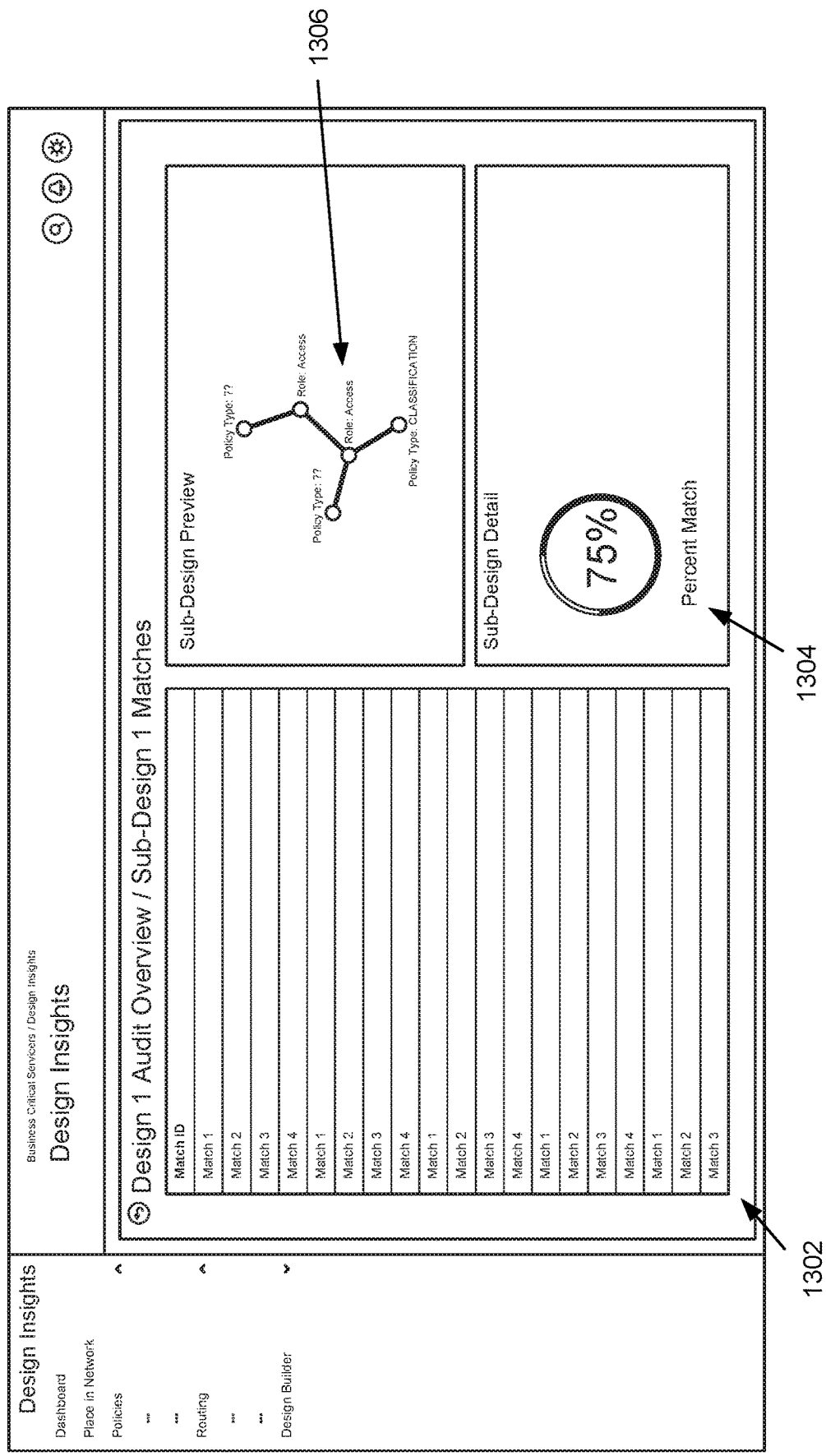
FIG. 13 schematically illustrates an example of matching and identification of portions of a network that align to a given network design.

FIG. 13 schematically illustrates an example of matching and identification of portions of a network that align to a given network design. A network design graph may be inferred from a validated network design, or manually created using a manual "design builder" function. Metadata components and relationships of network devices 104 and corresponding policies are identified by the document analysis engine 116 to create a large graph of an existing network. Portions of the network that match the design are listed at 1302. The proposed design customer network against which the network is audited is graphically illustrated at 1304. A closest match of the proposed design of the customer environment is illustrated at 1306.

Figure 14:
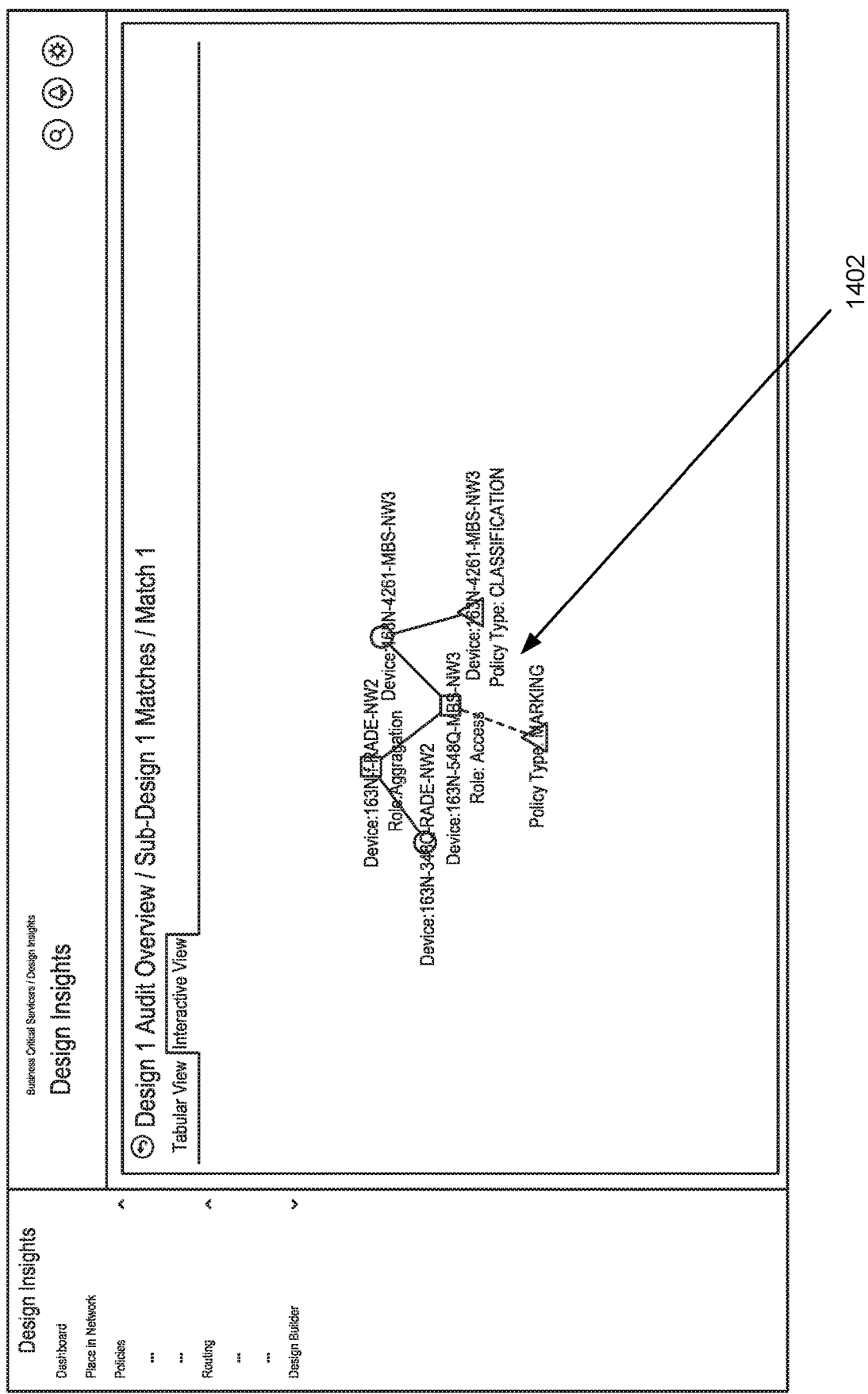
FIG. 14 schematically illustrates an example of the document analysis engine of the network of FIG. 1 identifying sub-graphs inside a larger graph.

FIG. 14 schematically illustrates an example of the document analysis engine 116 identifying sub-graphs inside the larger graph and showing the deviation or compliance to the network design that the network operator wishes to audit. In this example, the network design was created indicating that between particular role functions, a particular policy type and policy name may exist on interfaces that relate the network devices. The document analysis engine 116 is able to display sub-sets of the network 100 that directly conform to the network design, as well as indicate areas 1402 that do not match, e.g., with dotted lines, or match to a particular percentage. The distance calculation provides a statistical value of just how similar or different the implemented network design or configuration is from the network design solution, e.g., how compliant is the implemented network design or configuration with respect to the network design solution. Based upon the level of compliance, a remedial action may be performed. For example, the implemented network configuration may be altered. Additionally, a playbook may be developed for altering the network configuration. Also, in configurations, the network design solution may be altered.

As an overall example, component extraction is performed on a design document. Table 1 below illustrates a portion of a design document where relational keywords and roles are detected from the portion of the design document.

TABLE 1

The P Router design between the four regions will interconnect the eight sites representing data and energy centers of the regions. There are two P routers per site to reduce the number of cross links required for redundancy of the PE routers at the locations. PE router redundancy will be determined by the site as to whether it will have a single or dual PE. All connectivity between PE routers on the rings and the network will be made at the P nodes, limiting the number of PE routers that are strung together. The below diagram outlines the PE and P routers to be configured at each of the control/energy centers.

The portion of the design document contains highlighted language that describes multiple site locations, and the roles and connection types that exist in between the topology components. In accordance with configurations, a combination of Natural Language Processing and "Relational Keywords" may be used to identify network device classifications (roles as previously described) and creates relationships based on policies, as well as physical and logical relationships. Table 2 illustrates another portion of the design document, e.g., a "snip" of the design document, where the Natural Language Processing and "Relational Keywords" are used to detect relational and policy keywords (indicate in highlights).

TABLE 2

The network will have a single OSPF area that spans all provider edge, provider, and route reflector routers in the network. Connectivity between P routers and PE routers is defined by the standard usage of the OSPF Template - P/PE/RR CORE Routers to ensure IGP connectivity between all loopbacks addresses in the core. These loopbacks will be used to provide PE-to-PE BGP connectivity over top of the OSPF network via the CE-VPN Template...<snip>

Extracting descriptive definitions of relationship between policies and roles allows for the ability to build a relationship between configuration templates and design objects defined in the design document. Table 3 illustrates an example of a configuration template.

FIG. 39 OSPF Template—P/PE/RR CORE Routers

TABLE 3

```
}
key chain RPKEY
    key 1
        key-string RPKEY
        accept-lifetime 00:00:10 Jan 1 2019 infinite
        send-lifetime 00:00:10 Jan 1 2019 infinite
        cryptographic-algorithm md5
{
router ospf 1
    router-id W.X.Y.Z
    auto-cost reference-bandwidth 100000 < {100GB}
    nsr
    nsf
    area 0 authentication message-digest
    timers throttle spf 50 200 5000
    timers throttle lsa 50 200 5000
    timers lsa arrival 100
    network <interfaceIP> 0.0.0.0 area 0
    network <interfaceIP> 0.0.0.0 area 0
    bfd all-interfaces
```

Figure 15:
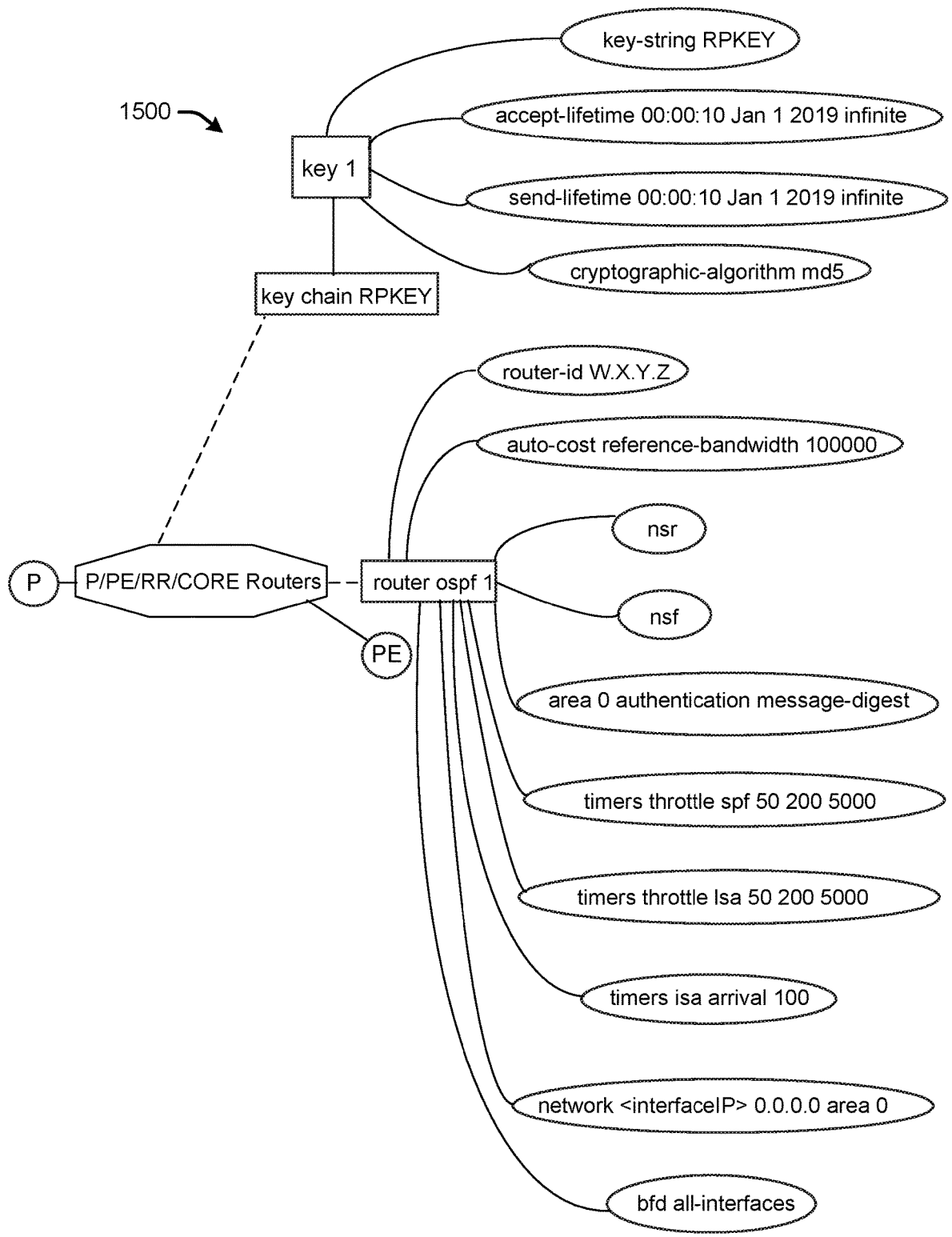
FIG. 15 illustrates an example graph after extraction of relationship information, which illustrates the RSPA chain taking shape.

The design document indicates that the network devices 104 configured as provider (P) devices have connectivity to the network devices 104 that are configured as provider edge (PE) devices defined by a policy template outlined in the design document. This relationship information can be extracted in graph form as previously described. FIG. 15 illustrates an example graph 1500 after the extraction of the relationship information, which illustrates the RSPA chain taking shape.

This extraction of role relationship and policy components provides the information that will later be used in auditing methods when comparing the graph of the existing environment in FIG. 15 against the proposed design. This repeated extraction of role type, connectivity, and policy defining relationship builds out the components of the design topology into the RSPA chain.

Figure 16:
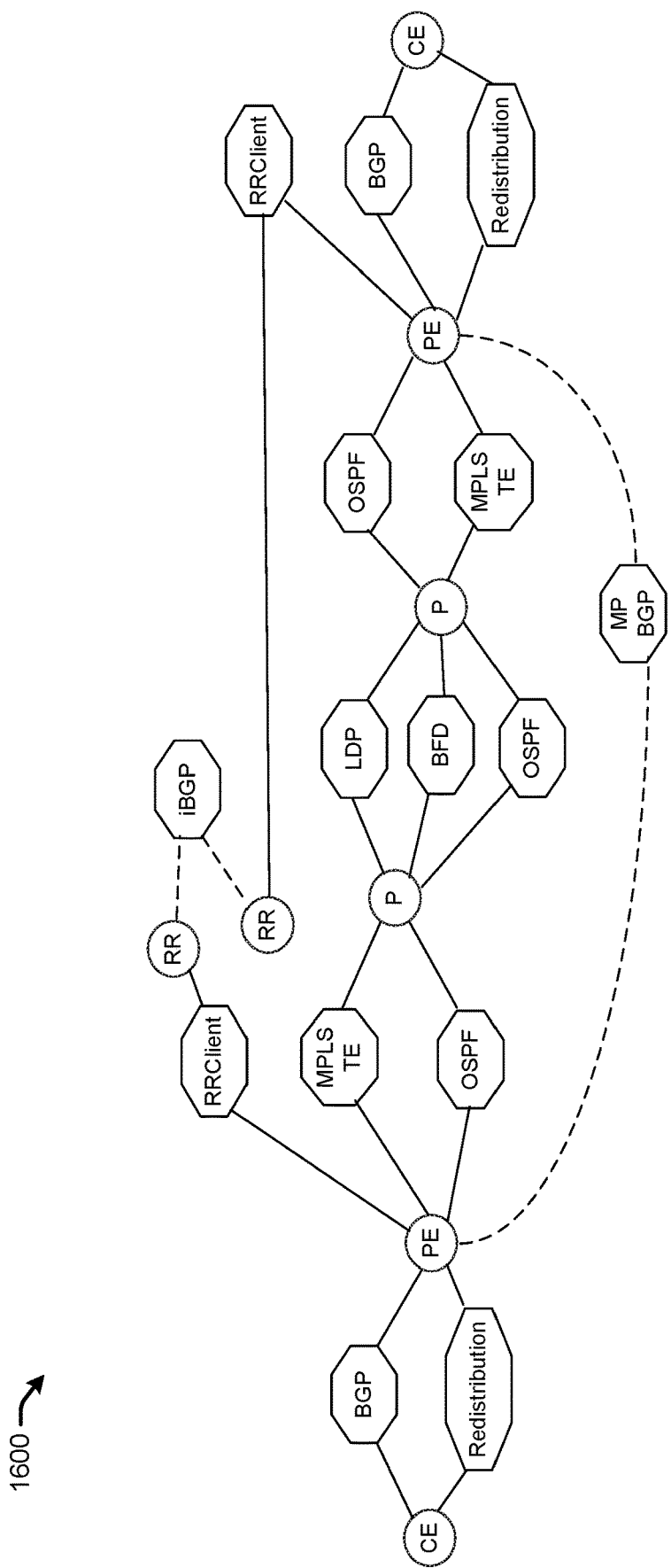
FIG. 16 schematically illustrates an example process of using the building blocks of policies, roles, sub-roles, service modules, service boundaries, and connectivity as the design elements and processes required to construct the RSPA chain through natural language processing of provided design documentation by a vendor or a network operator.

FIG. 16 illustrates an example of a process 1600 of using the building blocks of policies, roles, sub-roles, service modules, service boundaries, and connectivity as the design elements and processes required to construct the RSPA chain from natural language design documentation, as described herein. Based on the language used in the design documentation, the processes described herein link connectivity between roles and network devices and the policies that exist between these roles. An end to end flow of policy is developed that creates the RSPA chain and describes the flow that matches the low-level design.

Thus, the processes described herein examine and detect nuance that defines the relationships that are inherently described as part of the design document. As best practices are developed to fit the application of technologies to a solution, the processes extract the definition of relationship from design documentation and then uses the described building blocks of the RSPA chain to calculate distance from intended design. After the graph of relationships is determined from a particular design document, the same methodology may be applied to the client network environment to create a "client graph" of network devices, roles, policies and relationships. An audit may be performed that calculates distances of the differences between the design graph of FIG. 15 and the client graph, as well as "find a graph inside a graph." This means that it is not anticipated that a design document will 100% match a full client network environment. A design guide or LLD may define one or many patchworks of a network solution that exist in the client network environment. The process described herein uses graph comparison and isomorphs to determine portions and full design implementation inside portions of a client's network environment. Thus, no design document will generally fully match a deployed client environment. The processes described herein take into account identifying multiple network solutions that may overlap inside the client graph.

Accordingly, a network solution may be evaluated for compliance with a network solution using the process described, which leverage a framework that parses configuration sources into graph objects that define policies. A parsing engine, e.g., feature extraction engine 110, may work from a variety of sources and define the parent child relationship expected in a policy type. This provides the ability to increase technology and vendor support as new policy types are defined in network design documents. Relationships between network devices 104 and roles are defined in a similar way, with a parsing triggering off a particular source document. For example, the output of "show device neighbor" may be used to extract physical connectivity between network devices. Raw configuration may be used to find interfaces participating in routing protocols and create linkage between routing processes and neighbors via this and other show command output.

As the client network devices are processed by the parsing engine, and policy and relationships are discovered, the client graph takes shape mapping network devices to interfaces, policies to interfaces, and other network device interfaces to other network devices. The process ends with a complete graph that depicts all network devices, the interfaces that contain relationships to other network devices, and the policies that exist on the links that define the relationships. When the same policy parsers are applied to target configuration material (a full client network), the process ensures that a like comparison of the design objects available in the design documents and the design objects that exist in the client environment is made. The audit takes the extracted source graph (a design document graph) and attempts to find matches based on the isomorphism of the source and target (client graph).

Figure 17:
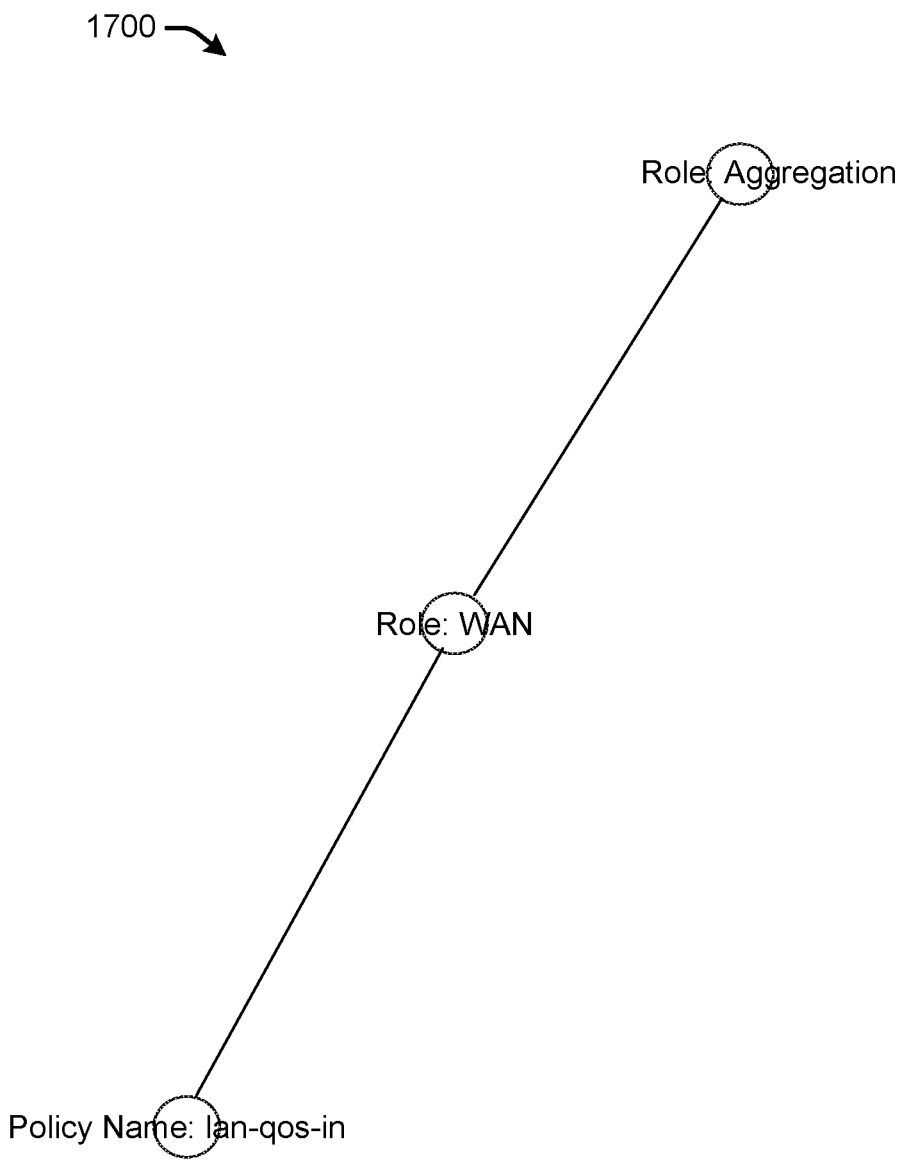
FIG. 17 schematically illustrates a graph based on extraction of a design based on a WAN device having physical connectivity to aggregation layer devices and the WAN device running a particular set of policies.

For example, a design based on a WAN device having physical connectivity to the aggregation layer, and the WAN device is running a particular policy is extracted and graphed in FIG. 17. The extracted graph 1700 is then searched against a graph that defines the entire client network environment, where the roles a network device was classified as, the relationship the network device has with other network devices and roles, and the policies that help define the relationships is known. The processes described herein not only look for exact matches of a design object to determine compliance, but systematically removes nodes and edges from the source graph to identify portions of the target client network that are "close matches" to the source network design. In this example, assume there are 29 instances where the network solution design was an exact match in the client network environment, and 363 instances where 2/3 of conditions were met, meaning the WAN device had the policy intended, but was physically connected to a role that was not an aggregation device. A design preview vs. audit result illustrates a comparison between the expected network design, and an applicable design match. The comparison provides the portion of the network including device names and interfaces where the design was detected, as illustrated in FIG. 13. Conversely, portions of the network where a design object is missing from the target client network, as indicated by the dashed line, as illustrated in FIG. 14, may be identified.

In configurations, one or more of the engines 110, 112, 114, and 116 may be a single engine that performs functions as described herein using one or more machine learning models.

FIG. 18 illustrates a flow diagram of an example method 1800 and illustrates aspects of the functions performed at least partly by one or more of the engines 110, 112, 114, and 116 as described with respect to FIGS. 1-17. The logical operations described herein with respect to FIG. 18 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 18 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 18 illustrates a flow diagram of an example method 1800 for determining compliance of a network with respect to a network design solution. In some examples, the method 1800 may be performed by a system comprising one or more processors and one or more non-transitory computer-readable media storing computer-executable instructions that, when executed by the one or more processors, cause the one or more processors to perform the method 1800. At 1802, a role for each network device of a network that comprises multiple network devices is determined. For example, the feature extraction engine 110 may determine a role within the network 100 for each network device 104. At 1804, one or more policies related to each network device with respect to other network devices of the network may be determined. For example, the policy analysis engine 114 may determine one or more policies for each network device 104 with respect to other network devices 104 within the network 100. At 1806, based at least in part on the roles for each network device and the one or more policies, determining a level of compliance of a configuration of the network with respect to a network design solution. For example, the document analysis engine 116 may parse one or more network design solution documents and use the roles and policies to determine a level of compliance with the network design solution. At, 1808, based at least in part on the level of compliance, a remedial action may be performed. For example, the configuration of the network may be altered, a playbook for altering the network configuration may be developed, or the network design solution may be altered.

Figure 19:
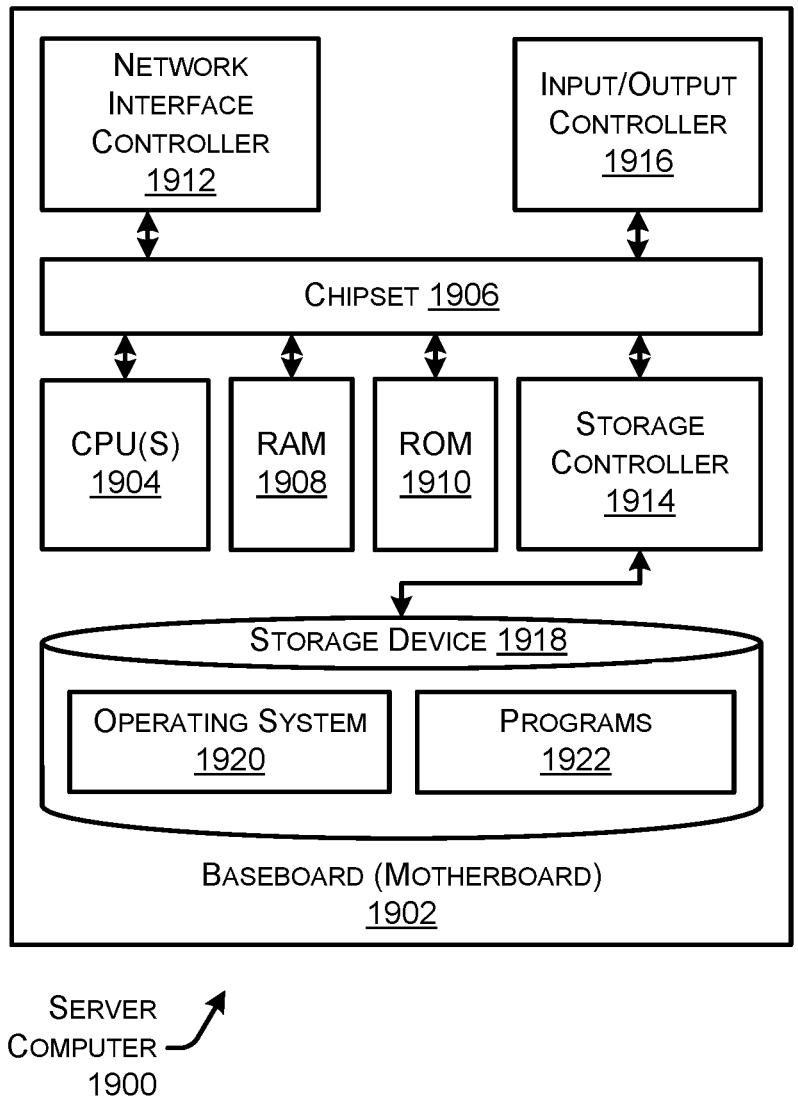
FIG. 19 is a computer network architecture diagram showing an illustrative computer hardware architecture for implementing a server device that can be utilized to implement aspects of the various technologies presented herein.

FIG. 19 shows an example computer architecture for a server computer 1500 capable of executing program components for implementing the functionality described above. The computer architecture shown in FIG. 19 illustrates a conventional server computer, workstation, desktop computer, laptop, tablet, network appliance, e-reader, smartphone, or other computing device, and can be utilized to execute any of the software components presented herein. The server computer 1900 may, in some examples, correspond to physical devices or resources described herein.

The server computer 1900 includes a baseboard 1902, or "motherboard," which is a printed circuit board to which a multitude of components or devices can be connected by way of a system bus or other electrical communication paths. In one illustrative configuration, one or more central processing units ("CPUs") 1904 operate in conjunction with a chipset 1906. The CPUs 1904 can be standard programmable processors that perform arithmetic and logical operations necessary for the operation of the server computer 1900.

The CPUs 1904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1906 provides an interface between the CPUs 1904 and the remainder of the components and devices on the baseboard 1902. The chipset 1906 can provide an interface to a RAM 1908, used as the main memory in the server computer 1900. The chipset 1906 can further provide an interface to a computer-readable storage medium such as a read-only memory ("ROM") 1910 or non-volatile RAM ("NVRAM") for storing basic routines that help to startup the server computer 1900 and to transfer information between the various components and devices. The ROM 1910 or NVRAM can also store other software components necessary for the operation of the server computer 1900 in accordance with the configurations described herein.

The server computer 1900 can operate in a networked environment using logical connections to remote computing devices and computer systems through a network, such as a LAN. The chipset 1906 can include functionality for providing network connectivity through a NIC 1912, such as a gigabit Ethernet adapter. The NIC 1912 is capable of connecting the server computer 1900 to other computing devices. It should be appreciated that multiple NICs 1912 can be present in the server computer 1900, connecting the computer to other types of networks and remote computer systems.

The server computer 1900 can be connected to a storage device 1918 that provides non-volatile storage for the computer. The storage device 1918 can store an operating system 1920, programs 1922, and data, which have been described in greater detail herein. The storage device 1918 can be connected to the server computer 1900 through a storage controller 1914 connected to the chipset 1906. The storage device 1918 can consist of one or more physical storage units. The storage controller 1914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 1900 can store data on the storage device 1918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1918 is characterized as primary or secondary storage, and the like.

For example, the server computer 1900 can store information to the storage device 1918 by issuing instructions through the storage controller 1914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 1900 can further read information from the storage device 1918 by detecting the physical states or characteristics of one or more particular locations within the physical storage units.

In addition to the storage device 1918 described above, the server computer 1900 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 1900. In some examples, the operations performed by the cloud computing network, and or any components included therein, may be supported by one or more devices similar to server computer 1900. Stated otherwise, some or all of the operations performed by cloud computing networks, and or any components included therein, may be performed by one or more server computers 1900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1918 can store an operating system 1920 utilized to control the operation of the server computer 1900. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 1918 can store other system or application programs and data utilized by the server computer 1900.

In one embodiment, the storage device 1918 or other computer-readable storage media is encoded with computer-executable instructions which, when loaded into the server computer 1900, transform the computer from a general-purpose computing system into a special-purpose computer capable of implementing the embodiments described herein. These computer-executable instructions transform the server computer 1900 by specifying how the CPUs 1904 transition between states, as described above. According to one embodiment, the server computer 1900 has access to computer-readable storage media storing computer-executable instructions which, when executed by the server computer 1900, perform the various processes described above with regard to FIGS. 1-18. The server computer 1900 can also include computer-readable storage media having instructions stored thereupon for performing any of the other computer-implemented operations described herein.

The server computer 1900 can also include one or more input/output controllers 1916 for receiving and processing input from a number of input devices, such as a keyboard, a mouse, a touchpad, a touch screen, an electronic stylus, or other type of input device. Similarly, an input/output controller 1916 can provide output to a display, such as a computer monitor, a flat-panel display, a digital projector, a printer, or other type of output device. It will be appreciated that the server computer 1900 might not include all of the components shown in FIG. 19, can include other components that are not explicitly shown in FIG. 19, or might utilize an architecture completely different than that shown in FIG. 19.

The server computer 1900 may support a virtualization layer, such as one or more virtual resources executing on the server computer 1900. In some examples, the virtualization layer may be supported by a hypervisor that provides one or more virtual machines running on the server computer 1900 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
    predicting a role for each network device of a network that comprises multiple network devices, wherein predicting the role for each network device comprises (i) analyzing feature configurations with respect to each network device, (ii) analyzing real-world deployment variations of network devices that exist within roles observed in networks, and (iii) analyzing information/metadata related to a state of each network device;
    determining one or more policies related to each network device with respect to other network devices of the network;
    performing component extraction on at least a portion of a design document that provides a network design solution for the network, wherein the component extraction detects relational keywords and design roles from the at least a portion of the design document;
    based at least in part on (i) the roles predicted for each network device, (ii) the one or more policies, and (iii) the relational keywords and design roles from the at least a portion of the design document, determining a level of compliance of a configuration of the network with respect to the network design solution; and
    based at least in part on the level of compliance, performing a remedial action.

2. The computer-implemented method of claim 1, wherein the predicting the role for each network device comprises predicting the role using a first machine learning model.

3. The computer-implemented method of claim 2, further comprising:
    training the first machine learning model with data from network devices external to the network.

4. The computer-implemented method of claim 3, wherein the first machine learning model comprises a Random Forest model.

5. The computer-implemented method of claim 2, further comprising:
    determining an importance of each network device,
    wherein determining a level of compliance of the configuration of the network with respect to the network design solution is further based at least in part on the importance of each network device.

6. The computer-implemented method of claim 5, wherein the determining the importance of each network device comprises determining the importance of each network device using a second machine learning model.

7. The computer-implemented method of claim 5, further comprising:
    discovering relationships between roles existing in a community of network devices; and
    mapping the relationships to define service modules that comprise the network.

8. The computer-implemented method of claim 7, further comprising:
    determining that a first service module comprising a first set of network devices is configured differently than a second service module comprising a second set of network devices.

9. The computer-implemented method of claim 1, wherein the remedial action comprises one or more of altering the configuration of the network, developing a playbook for altering the configuration, or altering the network design solution.

10. A system comprising:
    one or more processors; and
    one or more non-transitory computer-readable media storing computer-executable instructions that, when executed by the one or more processors, cause the one or more processors to perform actions comprising:
        predicting a role for each network device of a network that comprises multiple network devices, wherein predicting the role for each network device comprises (i) analyzing feature configurations with respect to each network device, (ii) analyzing real-world deployment variations of network devices that exist within roles observed in networks, and (iii) analyzing information/metadata related to a state of each network device;
        performing component extraction on at least a portion of a design document that provides a network design solution for the network, wherein the component extraction detects relational keywords and design roles from the at least a portion of the design document;
        determining one or more policies related to each network device with respect to other network devices of the network;
        based at least in part on (i) the roles predicted for each network device, (ii) the one or more policies, and (iii) the relational keywords and design roles from the at least a portion of the design document, determining a level of compliance of a configuration of the network with respect to a network design solution; and based at least in part on the level of compliance, performing a remedial action.

11. The system of claim 10, wherein the predicting the role for each network device comprises predicting the role using a first machine learning model.

12. The system of claim 11, wherein the actions further comprise:
training the first machine learning model with data from network devices external to the network.

13. The system of claim 12, wherein the first machine learning model comprises a Random Forest model.

14. The system of claim 11, wherein the actions further comprise:
determining an importance of each network device,
wherein determining a level of compliance of the configuration of the network with respect to the network design solution is further based at least in part on the importance of each network device.

15. The system of claim 14, wherein the determining the importance of each network device comprises determining the importance of each network device using a second machine learning model.

16. The system of claim 14, wherein the actions further comprise:
discovering relationships between roles existing in a community of network devices; and
mapping the relationships to define service modules that comprise the network.

17. The system of claim 16, wherein the actions further comprise:
determining that a first service module comprising a first set of network devices is configured differently than a second service module comprising a second set of network devices.

18. The system of claim 10, wherein the remedial action comprises one or more of altering the configuration of the network, developing a playbook for altering the configuration, or altering the network design solution.

19. One or more non-transitory computer-readable media storing computer-executable instructions that, when executed by one or more processors, cause the one or more processors to perform actions comprising:
predicting a role for each network device of a network that comprises multiple network devices, wherein predicting the role for each network device comprises (i) analyzing feature configurations with respect to each network device, (ii) analyzing real-world deployment variations of network devices that exist within roles observed in networks, and (iii) analyzing information/metadata related to a state of each network device;
determining one or more policies related to each network device with respect to other network devices of the network;
performing component extraction on at least a portion of a design document that provides a network design solution for the network, wherein the component extraction detects relational keywords and design roles from the at least a portion of the design document;
based at least in part on (i) the roles predicted for each network device, and (iii) the relational keywords and design roles from the at least a portion of the design document, (ii) the one or more policies, determining a level of compliance of a configuration of the network with respect to a network design solution; and
based at least in part on the level of compliance, performing a remedial action.

20. The one or more non-transitory computer-readable media of claim 19, wherein the actions further comprise:
determining an importance of each network device,
wherein determining a level of compliance of the configuration of the network with respect to the network design solution is further based at least in part on the importance of each network device.

* * * * *